United States Patent
Matsui et al.

(10) Patent No.: US 6,201,869 B1
(45) Date of Patent: Mar. 13, 2001

(54) DATA TRANSFORMATION APPARATUS AND DATA TRANSFORMATION METHOD

(75) Inventors: Mitsuru Matsui; Toshio Tokita, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/836,401

(22) PCT Filed: Jul. 31, 1996

(86) PCT No.: PCT/JP96/02154

§ 371 Date: Apr. 28, 1997

§ 102(e) Date: Apr. 28, 1997

(87) PCT Pub. No.: WO97/09705

PCT Pub. Date: Mar. 13, 1997

(30) Foreign Application Priority Data

Sep. 5, 1995 (JP) .................................................. 7-227685
Jan. 25, 1996 (JP) .................................................. 8-011073

(51) Int. Cl.$^7$ ........................................................ H04L 9/00
(52) U.S. Cl. ............................................................... 380/37
(58) Field of Search .................................. 380/28, 37, 29

(56) References Cited

U.S. PATENT DOCUMENTS

| 5,261,003 | * 11/1993 | Mutsui ................................. 380/28 |
| 5,317,638 | 5/1994 | Kao et al. . |
| 5,488,661 | 1/1996 | Matsui . |

FOREIGN PATENT DOCUMENTS

| 60-37586 | 2/1985 | (JP) . |
| 61-117940 | 6/1986 | (JP) . |
| 1-276189 | 11/1989 | (JP) . |
| 3-129384 | 6/1991 | (JP) . |
| 4-170576 | 6/1992 | (JP) . |
| 5-35448 | 2/1993 | (JP) . |
| 5-88849 | 4/1993 | (JP) . |
| 06075525A | 3/1994 | (JP) . |
| 7-191603 | 7/1995 | (JP) . |
| 08179690A | 7/1996 | (JP) . |
| 09090870A1 | 4/1997 | (JP) . |

OTHER PUBLICATIONS

Mitsuru Matsui, New Block Encryption Algorithm MISTY, 4th International Workshop, FSE'97, Haifa, Israel, Jan. 1997.

Mitsuru Matsui,*On Provable Security of Block Ciphers Against Differential and Linear Cryptanalysis*, 18th Sympoisum of Information Theory and its application. (SITA95) Hanamaki, Japan Oct. 24–27, 1995, pp. 175–178.

Hiroyuki Matsumoto et al., *The FEAL Encryption Processor for Multimedia Communications*, NTT R&D vol. 41, No. 6, 1992, pp. 777–785, Fig. 5.

(List continued on next page.)

*Primary Examiner*—Salvatore Cangialosi

(57) ABSTRACT

Data transformation apparatuses and methods for transforming two arbitrary pieces of data of A input data and B input data, wherein a first nonlinear transformation of the A input data is performed using a first key parameter, a transformed result is output, an XOR operation of the transformed result and the B input data is performed to output an XORed result as B intermediate data, and the B intermediate data is input to a next sub-transformation unit as B input data. On the other hand, the B input data is input to a next sub-transformation unit as A input data. A second nonlinear transformation of the B input data is performed using a second key parameter, the transformed result is output, an XOR operation of the transformed result and the B intermediate data is performed to output an XORed result as B intermediate data, and the B intermediate data is input to a next sub-transformation unit as B input data. The above configurations are connected in a cascade and the last A intermediate data and B intermediate data are output as a transformation result.

35 Claims, 29 Drawing Sheets

OTHER PUBLICATIONS

International Search Report issued in PCT/JP96/02154; filed on Jul. 31, 1996.

Mitsuru Matsui "On Provable Security Against Differential and Linear Cryptanalysis of Block Ciphers, Preliminary Reports from the 18th Symposium of Information Theory . . . " Oct. 1995, vol. 1 or 2.

Mitsuru Matsui "New Structure of Block Ciphers with Provable Security against Differential and Linear Cryptanalysis" Lecture Notes in Computer Science, Springer–Verlag, 1996, vol. 1039.

Mitsuru Matsui, et al "Practical Block Ciphers with Provable Security Against Differential and Linear Cryptanalysis" IEICE Information Security Research AD HOC Committee, Jan. 1996.

NEC, Mitsubishi Electric Corporation has Developed Particular Cipher Algorithm, Nikkei Electronics, Nikkei BP, No. 648, Nov. 6, 1995.

"What is Common Key Block Cipher? Would you be kind to tell me about MISTY Ciphers?" Electronics, Ohm. May 1996.

"Cryptographics in the Internet Age" Nikkei Electronics, Nikkei BP, No. 658, Mar. 25, 1996.

Matsui M., "Linear Cryptanalysis Method for DES Cipher" Eurocrypt '93, Lecture Notes in Computer Science, Springer–Verlag, 1993.

Matsui, M., et al "A New Cryptanalytic Method for FEAL Cipher" IEICE Trnasactions on Fundamentals of Electronics Communications and Computer Sciences, IEICE, Jan. 1994.

Koyama K., et al, How to Strengthen DES–like Cryptosystems against Differential Cryptanalysis, IEICE Transactions on Fundamentals of Electronics, IEICE, Jan. 1994.

\* cited by examiner

```
S7[128] = {
    85,  95,  53,  57,  65,  63,  99,  27,  86,  31,  33, 110,  18,  47,  39,  28,
    29,  61,  37,   3,  66,  22,  56, 106,  15, 108,  32,  69,   0,  23, 109, 124,
   101,  96,  97,  98,  64,  49,   6, 113,  30,  88,  13,  77, 107,  89,  58,  14,
    36,  11, 120,  81,  74,  17,  84,   9,  78,  34,   5, 111, 112, 104, 121, 103,
    80, 126,  90, 114,  82,   8,  26,  70,  94,  51,  67,  40,  12,  21,  83,  76,
    45,  41, 127, 125, 100,  20, 116,   2,  50, 117, 119,  54,  43,  24,  44,  25,
    72, 105,  38,   1, 123,  46,  87,   4,  62,  92,  71,  35,  93,  75, 102, 118,
    60,  55,  10,   7,  68,  59,  48,  73,  91,  19, 122,  52, 115,  79,  16,  42, };
```

Table 1: The table of *S7*

S9[512] = {
341, 310,  37, 213,  79, 140, 348, 268, 379, 262, 266, 484, 273, 460, 259, 333,
241, 402, 295, 215, 419,  96,  22, 326, 453, 184, 274, 252, 487,  58, 339,  29,
220, 255, 420, 276, 103, 228, 380, 364, 230, 219, 159,  49, 301, 432, 311, 313,
342, 117, 136, 312, 421,  38,  24, 264, 118, 331, 169, 263, 501, 104, 329,  71,
280, 472, 120,  43,   6, 102, 261, 502, 127, 161,  30,  83,  17, 111,  19, 254,
 62, 510, 504, 171, 360,   8, 205, 318,  67, 413, 132, 457, 101, 283, 193, 300,
309, 437,  93,  78, 394, 426, 129,  50,  70, 216,  47,  34, 393, 439, 387, 302,
 61, 445, 499, 224, 202, 490, 359, 212,  84, 458, 155, 406, 467, 237, 383, 210,
385, 506, 400, 376, 153,  66, 235, 163, 303, 330,  63, 201, 327, 386,  52,  98,
121, 258, 206, 294, 297, 242, 509, 181, 461, 168, 123, 397, 493,  40,  56, 366,
 41,  18,  48, 152, 144,  11, 234, 226, 147, 182, 395, 317, 346, 479,  33,  55,
511, 196, 320, 232, 270, 149, 466, 218,  95, 378, 481,  87, 478,  91,   3, 277,
 69, 157,  68,  15, 345, 289, 315, 464, 418, 356, 162, 247, 462, 424, 173,  88,
319, 231, 408, 211, 107, 275, 175, 324, 450,   4, 100, 305, 486, 128,  35, 470,
 73, 209,  64,  75, 244, 204, 158,  53, 442, 316, 178, 167, 119,  81, 284, 425,
285, 133, 434, 185, 488, 208, 292, 143, 500, 114,  90, 335, 113, 343, 444,   9,
454, 369, 176, 148, 388, 403, 145,  21, 456, 353, 447, 389, 250, 243, 238, 116,
 99, 468, 435, 151, 105, 382, 474,  94, 375, 222, 422, 156,  13, 260, 191, 293,
217,  46, 423, 451, 314, 365,  39, 227, 195,  42, 188, 198,  80,  25,  76, 150,
338, 165, 138, 494, 249, 430, 322, 134,  82, 443, 139, 497, 137, 448,  51, 489,
203, 223, 429, 298, 141,  57, 392, 431, 396, 390, 491, 370, 186,  16, 190, 135,
492, 248,  44, 427, 482,  86,  65, 358, 433, 187, 368, 233, 207, 357, 109, 340,
112,  36, 286, 473, 407, 355, 154, 253, 291, 361, 332, 405, 436, 350, 440, 449,
377,  45, 177, 374, 214, 290, 381,  26, 304, 122, 505,  32, 495,   5, 325,  60,
351, 496, 328, 372, 287, 272, 363, 503, 465, 352, 199, 229, 225, 240, 404, 278,
166, 265,  23, 299, 174, 417, 124, 480, 306, 131, 130, 416,  74, 347, 409,  27,
 97, 142, 126,   2, 384, 463, 508, 288, 251,  10, 485, 391, 106,  59, 279, 469,
438,  89, 271, 115,  31, 336, 197, 281,  54, 455, 398, 236, 239, 446, 308, 246,
475, 471, 476, 323, 415, 307, 507, 452,  28,  14, 282, 411, 296, 410,  77, 108,
160, 428,   1, 414, 172, 256, 110, 337, 125, 367, 477,  92, 257, 179, 194, 483,
321, 269, 334, 401, 164,  72, 200, 183, 146, 192, 412, 349,   7, 245, 362, 267,
 20, 344, 189, 354, 441,  85, 371,  12, 221, 399, 373, 180,   0, 498, 459, 170 };

Table 2: The table of S9

Fig.26

| EMBODI-MENT | EXTERNAL | | INTERNAL | | OTHER | |
|---|---|---|---|---|---|---|
| | EXTERNAL TRANSFORMATION UNIT | 6, 7, 8 REPEATING UNIT | 3 INTERNAL SUB-TRANSFORMATION UNIT | 6, 7, 8 REPEATING UNIT | 9, 11 S7·S9 NONLINEAR TRANSFORMER | 10, 11 DATA TRANSFORMER |
| 1 | TYPE1 (Fig.1) | { EVEN STAGE (Fig.14) / ODD STAGE (Fig.16) } | { TYPE1 (Fig.6) / TYPE2 } | { EVEN STAGE / ODD STAGE } | S7·S9 | DATA TRANSFORMER (Fig.25) |
| 2 | TYPE2 (Fig.2) | { EVEN STAGE (Fig.15) / ODD STAGE } | { TYPE1 / TYPE2 } | { EVEN STAGE / ODD STAGE } | S7·S9 | DATA TRANSFORMER |
| 4 | CONVENTIONAL TYPE (Fig.29) | { EVEN STAGE / ODD STAGE } | { TYPE1 (Fig.11) / TYPE2 } | { EVEN STAGE / ODD STAGE } | S7·S9 (Fig.19) | DATA TRANSFORMER (Fig.23) |
| 5 | DIVIDED INPUT TYPE (Fig.13) | { EVEN STAGE / ODD STAGE } | { TYPE1 (Fig.13) / TYPE2 } | { EVEN STAGE / ODD STAGE } | S7·S9 | DATA TRANSFORMER |

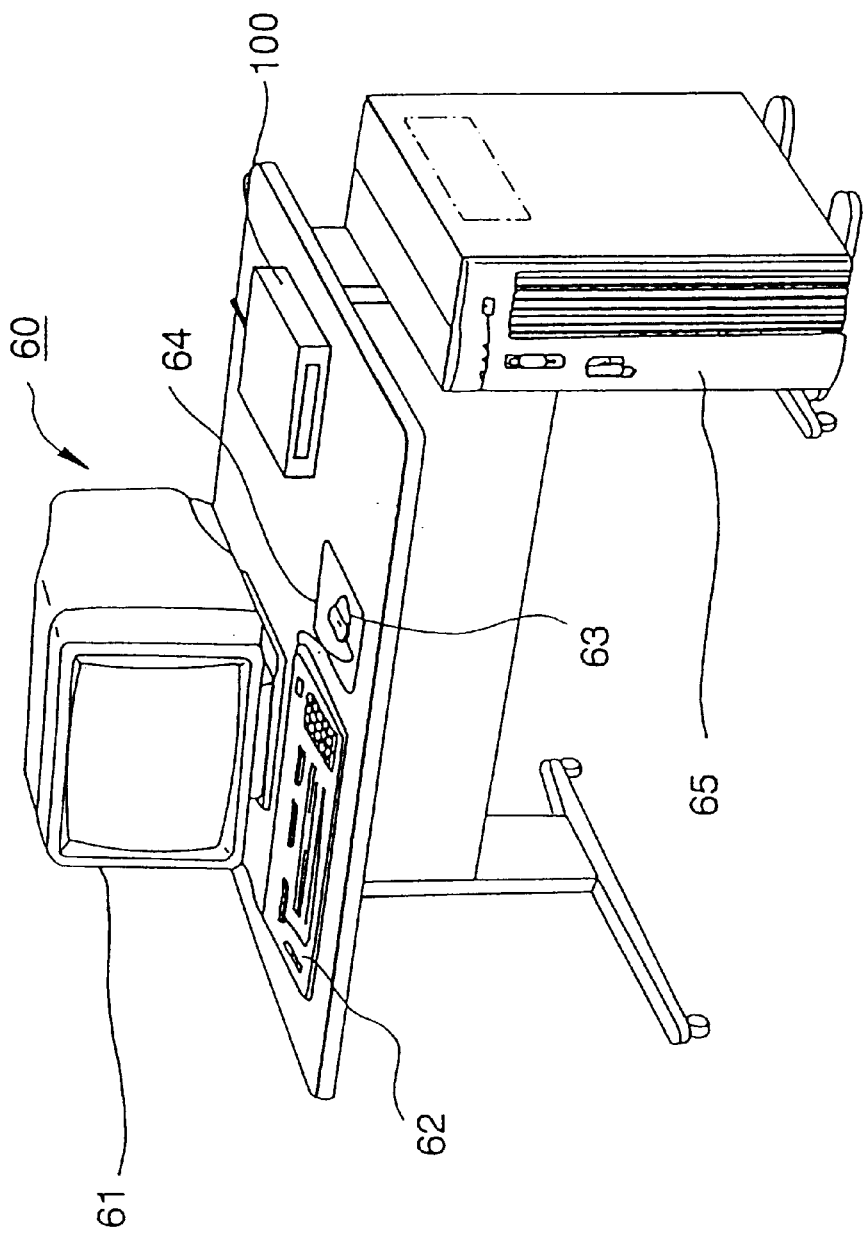

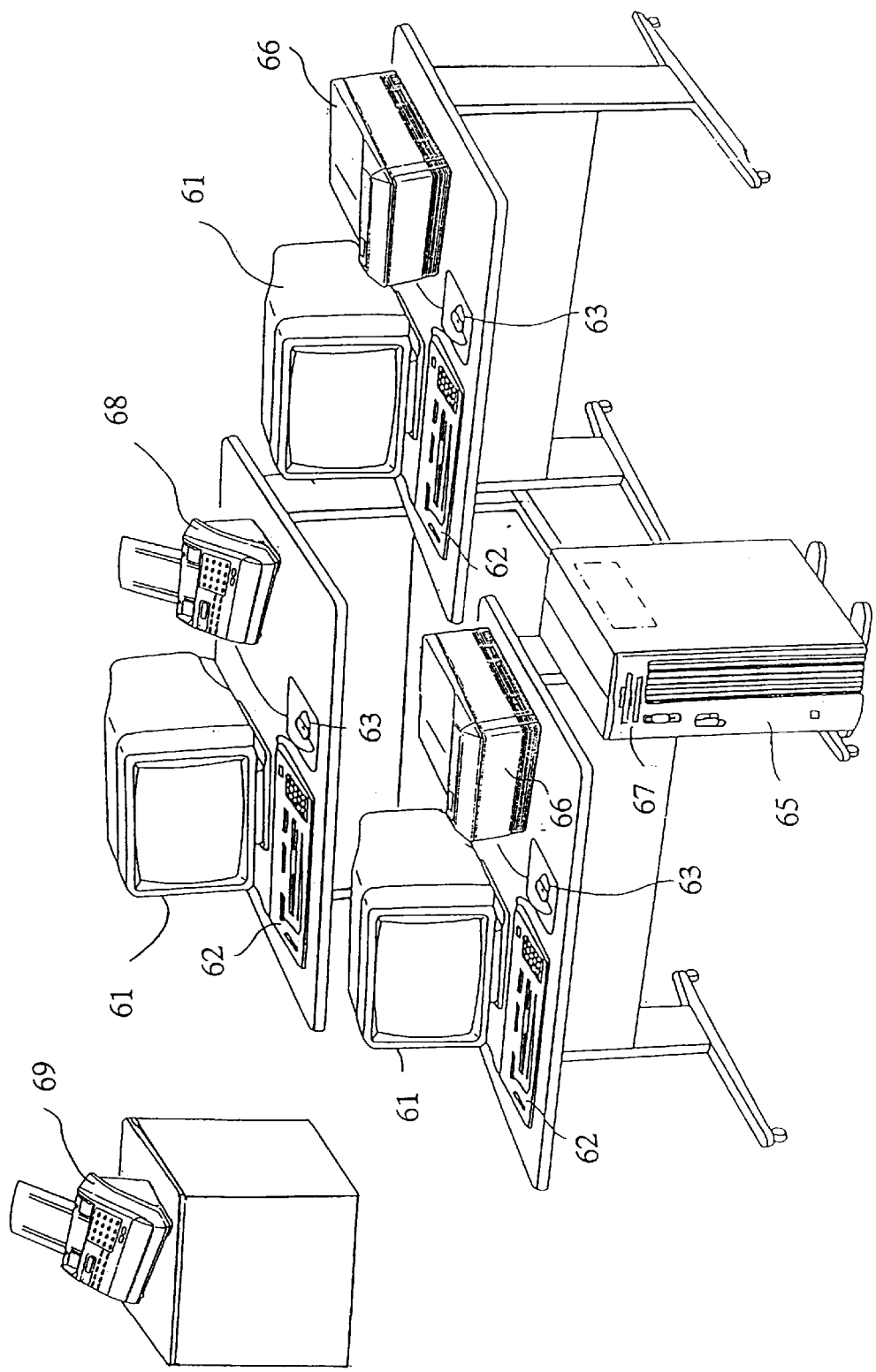

DATA TRANSFORMATION APPARATUS AND DATA TRANSFORMATION METHOD

TECHNICAL FIELD

The present invention relates to a data transformation apparatus and a data transformation method for encryption, decryption of input data and data diffusion in order to protect digital information of communication.

BACKGROUND ART

As a conventional data transformation method for encryption, "FEAL-8 Algorithm" (Fast data Encipherment Algorithm-8) is disclosed by Miyaguchi et al. (Miyaguchi, Shiraishi, and Shimizu, "FEAL-8 Encipherment Algorithm" NTT Practical Research Report vol. 39, No. 4/5, 1988).

FIG. 29 is a partial diagram of the above "FEAL-8" encipherment algorithm.

In the figure, 1001 and 1002 denote input data of two sequences, 1003 and 1004 denote output data of two sequences, and 1005, 1006, 1007 and 1008 denote intermediate data. 1011, 1012, 1013 and 1014 respectively show a first key parameter, a second key parameter, a third key parameter and a fourth key parameter. Each of 1021, 1022, 1023 and 1024 shows sub-transformation unit of each transforming stage. Each sub-transformation unit includes each of nonlinear transformers 1031, 1032, 1033, 1034 and each of XOR (exclusive OR) circuits 1041, 1042, 1043, 1044.

An operation will be explained hereinafter. The input data 1001 and 1002 of two sequences are received at the sub-transformation unit 1021 of a first stage to be transformed into new data, that is, the intermediate data 1005 and 1006 of two sequences. The intermediate data is input to the sub-transformation unit 1022 of a second stage to be transformed into new data, that is, the intermediate data 1007 and 1008. The above operation is repeated eight times in total, and the output data 1003 and 1004 of two sequences are output as the last transformation result from the sub-transformation unit of an eighth stage.

An operation of the sub-transformation unit 1021 of the first stage will be explained for one example of the above sub-transformation units.

The sub-transformation unit 1021 receives the input data 1001 and 1002 of two sequences and outputs the intermediate data 1005 and 1006 of two sequences. As described in detail in the above Practical Research Report, the second input data, that is, the input data 1002, is divided into byte by byte and the divided data is then XORed with the key parameter. Arithmetic addition is repeated to the data and the divided data is united again. This nonlinear transforming operation is performed in the nonlinear transformer 1031. The transformed data is XORed with the first input data 1001. The XORed result is output from the first stage as the second intermediate data 1006. On the other hand, the second input data 1002 is output as the first intermediate data 1005 without any transformation.

In the second sub-transformation unit 1022, data is processed as well as in the above procedure and the intermediate data of the second stage is obtained. In the same way, in this example, the processes of eight stages are performed in total. As the result, output data 1003 and 1004 are obtained.

The conventional data transformation apparatus is configured as described above. The transformed data is output only after the nonlinear transformation is completed in one stage of the sub-transformation unit, and is input to the sub-transformation unit of the next stage. Namely, each sub-transformation is performed sequentially and it takes time to perform an entire procedure.

The present invention is provided to solve the above problem. The object of the invention is to perform a plurality of sub-transformations in parallel to increase the processing speed of data transformation such as encryption, decryption and data diffusion.

DISCLOSURE OF THE INVENTION

The data transformation apparatus of the present invention inputs two arbitrary pieces of data of A input data and B input data to a first unit of the apparatus. A first nonlinear transformation of A input data is performed using a first key parameter and the transformed data is XORed with B input data. The XORed result is output as B intermediate data. B input data is also output as A intermediate data without any transformation. In a next unit, a second nonlinear transformation of A intermediate data is performed using a second key parameter and the transformed data is XORed with B intermediate data. The XORed result is output as next B intermediate data. B intermediate data output from the first unit is output as next A intermediate data without any transformation. The above two units are connected in a cascade and the last A intermediate data and the last B intermediate data are output as transformation result of the data transformation apparatus.

Further, in the above basic configuration of the apparatus, a set of a first nonlinear transformer and an XOR circuit located between an input side of the first nonlinear transformation and an input side of the second nonlinear transformation is defined as a first sub-transformation unit. Another set of a second nonlinear transformer and an XOR circuit located between the input side of the second nonlinear transformation and the input side of the first nonlinear transformation of the next stage is defined as a second sub-transformation unit. Otherwise, a set of the XOR circuit and the second nonlinear transformer located between an output side of the first nonlinear transformation and an output side of the second nonlinear transformation is defined as the first sub-transformation unit. Another set of the XOR circuit and the first nonlinear transformer located between the output side of the second nonlinear transformation and the output side of the first nonlinear transformation of the next stage is defined as the second sub-transformation unit. Regardless of the definition, a necessary number of the above first sub-transformation units and the second sub-transformation units are alternately connected in a cascade. From the last stage, A intermediate data and B intermediate data output from either of the first and the second sub-transformation units is output as the transformation result of the apparatus.

Further, the nonlinear transformer of each sub-transformation unit has a nest configuration of the basic configuration of data transformation apparatus.

According to a data transformation method of the present invention, two arbitrary pieces of data of A input data and B input data are input. B input data is output as a first A intermediate data at a first step. A nonlinear transformation of A input data is performed using a first key parameter. The transformed data is XORed with B input data and the XORed result is output as a first B intermediate data at a second step. At a third step, the first B intermediate data is input and output as a second A intermediate data. The first A intermediate data is input and a nonlinear transformation of the A intermediate data is performed using a second key parameter. The transformed data is XORed with the first B intermediate data and the XORed result is output as a second B intermediate data at a fourth step. The above steps are repeated from the first step to the fourth step. The above second step or the fourth step should be placed at the last step of the transformation method and the last A intermediate data and the last B intermediate data are output as the transformation result of the whole procedure.

In the above method, an operation order may be changed, that is, a nonlinear transformation and an XOR operation may be altered. The method still have effective steps as the above.

Further, in the above basic configuration of the apparatus, a set of the first nonlinear transformer and the XOR circuit located between the input side of the first nonlinear transformation and the input side of the second nonlinear transformation is defined as the first sub-transformation unit. Another set of the second nonlinear transformer and the XOR circuit located between the input side of the second nonlinear transformation and the input side of the first nonlinear transformation of the next stage is defined as the second sub-transformation unit. Otherwise, a set of the XOR circuit and the second nonlinear transformer located between the output side of the first nonlinear transformation and the output side of the second nonlinear transformation is defined as the first sub-transformation unit. Another set of XOR circuit and the first nonlinear transformer located between the output side of the second nonlinear transformation and the output side of the first nonlinear transformation of the next stage is defined as the second sub-transformation unit. Regardless of the definition, a necessary number of the above first sub-transformation units and the second sub-transformation units are alternately connected in a cascade. A data selecting unit is provided to the input side of the first sub-transformation unit and a data holding unit is also provided to the output side of either of the first and the second sub-transformation units. At the beginning of the data transformation, the data selecting unit selects one of two arbitrary pieces of data of A input data and B input data. After selecting one input data, the data selecting unit is connected with the data holding unit to form a feedback loop so as to select the output of the data holding unit. The selected data is transformed to be finally output from either of the first and the second sub-transformation units and is stored in the data holding unit. Then, A intermediate data and B intermediate data are output from the data holding unit as the transformation result of the apparatus.

Further, in the above basic configuration of the data transformation apparatus, the two arbitrary pieces of data of A input data and B input data include the same number of digits of data. Either of a set of the first nonlinear transformer and the XOR circuit located between the input side of the first nonlinear transformation and the input side of the second nonlinear transformation and a set of the second nonlinear transformer and the XOR circuit located between the output side of the second nonlinear transformation and the output side of the first nonlinear transformation is defined as a sub-transformation unit. A necessary number of the sub-transformation units are connected. The data selecting unit is provided to each of the two input sides of A input data and B input data of the first sub-transformation unit. The data holding unit is provided to each of the two output sides of A output data and B output data of the last sub-transformation unit. As a first step of the data transformation procedure, the data selecting units select A input data and B input data, respectively. After selecting the input data, the data selecting unit is connected with the data holding unit to form the feedback loop so as to select the output of the data holding unit. The selected data is transformed and, finally, the data holding unit outputs A intermediate data and B intermediate data as the transformation result.

Further, in the first or the second nonlinear transformation, A input data is divided into A1 input data including some digits of A input data and A2 input data including the other digits of A input data. The key parameter is also divided by an arbitrary number of digits into "n" number of divided key parameters, from a first divided key parameter to an n-th divided key parameter. In a first internal sub-transformation unit, an internal nonlinear transformation of A1 input data, that is, one of the divided A input data, is performed using the first divided key parameter. The transformed data is XORed with the A2 input data and the XORed result is output as first A2 internal intermediate data. A2 input data is output as first A1 internal intermediate data without any transformation. The first A1 internal intermediate data output from the first internal sub-transformation unit is input to a second internal sub-transformation unit as A1 input data. An internal nonlinear transformation of the first A1 internal intermediate data is performed using the second divided key parameter. The first A2 internal intermediate data, input as A2 input data, is XORed with the transformed first A1 internal intermediate data. The XORed result is output as second A2 internal intermediate data and the first A2 internal intermediate data is output as second A1 internal intermediate data without any transformation. The above first internal sub-transformation unit and the second internal sub-transformation unit are alternately connected "n" times. An internal data selecting unit is provided to the input side of the first internal sub-transformation unit and an internal data holding unit is provided to either of the output sides of the first and the second internal sub-transformation units. The internal data selecting unit selects A1 input data and A2 input data. After selecting the input data, the internal data selecting unit is connected with the internal data holding unit to form the feedback loop so as to select the output of the internal data holding unit. The selected data is transformed and, finally, A1 internal intermediate data and A2 internal intermediate data is output from the internal data holding unit as the transformed A output data.

Further, in the nonlinear transformation of each sub-transformation unit, A input data is divided into A1 input data including some digits of A input data and A2 input data including the other digits of A input data. The key parameter is also divided by an arbitrary number of digits into "n" number of divided key parameters, from a first divided key parameter to an n-th divided key parameter. In the first internal sub-transformation unit, an internal nonlinear transformation of A1 input data, that is, one of the divided A input data, is performed using the first divided key parameter. The transformed data is output as first A2 internal intermediate data. A1 input data is XORed with the A2 input data and the XORed result is output as first A1 internal intermediate data. In the second internal sub-transformation unit, an internal nonlinear transformation of the first A1 internal intermediate data, output from the first internal sub-transformation unit and input as A1 input data, is performed using the second divided key parameter. The transformed data is output as second A2 internal intermediate data. An XOR operation of the first A1 internal intermediate data and the first A2 internal intermediate data is performed as A1 input data and A2 input data. The XORed result is output as second A2 internal intermediate data and the first A2 internal intermediate data is output as second A1 internal intermediate data. The above first internal sub-transformation unit and the second internal sub-transformation unit are alternately connected "n" times. The internal data selecting unit is provided to each of the input sides of the first internal sub-transformation unit and the internal data holding unit is provided to either of the output sides of the first and the second internal sub-transformation units. The internal data selecting unit selects A1 input data and A2 input data. After selecting the input data, the internal data selecting unit is connected with the internal data holding unit to form the feedback loop so as to select the output of the internal data holding unit. The selected data is transformed and, finally, A1 internal intermediate data and A2 internal intermediate data are output from the internal data holding unit as the transformed A output data.

Further, in both of the above two kinds of modification of the data transformation apparatus, when A input data is divided into two pieces of divided input data having the same number of digits, only the first internal sub-transformation unit is connected necessary number of times.

Further, the first internal sub-transformation unit and the second internal sub-transformation unit are alternately connected necessary number of times. The internal data selecting unit is provided to the input side of the first internal sub-transformation unit and the internal data holding unit is provided to the output side of either of the first and the second internal sub-transformation units. As a first step of the data transformation, the internal data selecting unit selects B1 input data and B2 input data. After selecting the input data, the internal data selecting unit is connected with the internal data holding unit to form the feedback loop so as to select the output of the internal data holding unit. The selected data is transformed and, finally, B1 internal intermediate data and B2 internal intermediate data are output from the internal data holding unit as the transformed B output data.

Further, in the above configuration, when B input data is divided into two divided input data having the same number of digits, only the first internal sub-transformation unit is connected necessary number of times.

Further, in the data transformation apparatus, the sub-transformation units are connected even number of times. The data selecting unit is provided to the input side of the first sub-transformation unit and the data holding unit is provided to the output side of the last sub-transformation unit. A key parameter supply unit is also provided to the above configuration. As a first step of the data transformation, the data selecting unit selects two arbitrary pieces of data of A input data and B input data. After selecting the input data, the data selecting unit is connected with the data holding unit to form the feedback loop so as to select the output of the data holding unit. The data transformation apparatus repeatedly transforms the selected data using the key parameters, each of which is supplied by the key parameter supply unit to each of the sub-transformation units. The data holding unit finally outputs A intermediate data and B intermediate data as the transformation result.

Further, in the above configuration, at least one of the nonlinear transformers is (X:an element) circuit on Galois Field.

Further, the above $X^n$ circuit on Galois Field is formed by a normal basis.

Further, in the above configuration, at least one part of the nonlinear transformer is a Read Only Memory.

Further, in the above configuration, at least one part of the nonlinear transformer is a Random Access Memory.

Further, in the above configuration, at least one part of the nonlinear transformer is a Logic Circuit.

Further, a data transformer including two logic circuits is provided to at least one of A input and B input. Each of the above two logic circuits may be either of two XOR circuits and AND circuit and OR circuits. A input data or B input data is divided into two pieces of divided data having an arbitrary number of digits such as AA data and AB data. The key parameter is divided into two divided key parameters, A transformation key parameter and B transformation key parameter. A first AND/OR operation of AA data and A transformation key parameter is performed. The first ANDed/ORed result is first XORed with the AB data and the first XORed result is output as the transformation result of AB data. The first XORed result is second ANDed/ORed with B transformation key parameter. A second XOR operation of the second ANDed/ORed result and AA data is performed and the second XORed result is output as the transformation result of AA data. The transformed AA data and the transformed AB data are output to the next stage as A input data or B input data.

BRIEF DESCRIPTION OF THE DRAWINGS

FIG. 26 shows each feature of eleven embodiments from the first embodiment to the eleventh embodiment, FIG. 27 shows an application example of the data transformation apparatus of the invention, FIG. 28 shows an application example of the data transformation apparatus of the invention.

BEST MODE FOR CARRYING OUT THE INVENTION

Embodiment 1

In a field of information processing, encryption and decryption has been drawing the attention in order to keep security of data or security of communication between the persons. It is important for encryption and decryption to process data at a high speed and to reduce possibility of cryptanalysis.

As for one of well-known encryption method, input data is nonlinearly transformed using a key parameter. So called differential probability shows strength of cipher. It can be said that the cipher is strong when differential probability is small. According to Document 1: Provable Security Against Differential Cryptanalysis, by Kaisa Nyberg, Lars Ramkilde Knudsen, Journal of Cryptology vol. 8, No. 1 (1995), on encryption of data by a cascade of a plurality of sub-transformations, if differential probability of nonlinear transformation is "p", the following is proved.

(1) If there are more than three stages of sub-transformations, the differential probability as a whole apparatus is less than $2p^2$ when nonlinear transformation is performed in the system where the value of output data is determined one by one corresponding to the input data.

In the above statement, the value of output data is determined one by one corresponding to the input data means the following. When input data X has one of values of 0–255 and output data Y has one of values of 0–255, a particular value of output data Y corresponding to a particular input data X is previously determined as a pair of input data and output data. For example, when the value of input data X is 8, the value of the output data Y is always 125.

Figure 29:
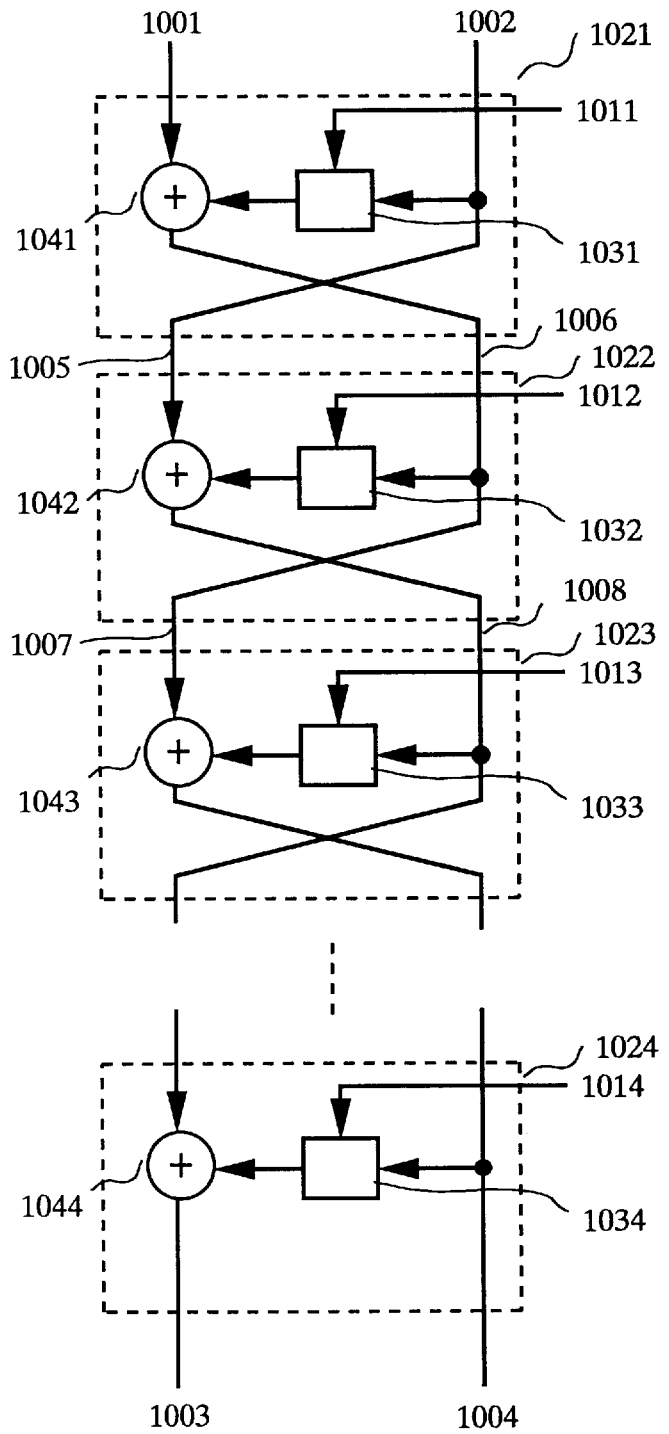
FIG. 29 shows a configuration of a conventional data transformation apparatus.

In the algorithm shown in FIG. 29, if each of the differential probabilities of the nonlinear transformers 1031, 1032 and 1033 is "p", the differential probability of the whole algorithm of FIG. 29 becomes less than $2p^2$.

The conventional art of FEAL Algorithm belongs to a type of algorithms shown in FIG. 29. In this FEAL Algorithm, the differential probability "p" is 1 in nonlinear transformation of each sub-transformation process, thus the differential probability of the whole algorithm becomes less than 2 according to the above statement. This proves nothing about strength of cipher.

Figure 2:
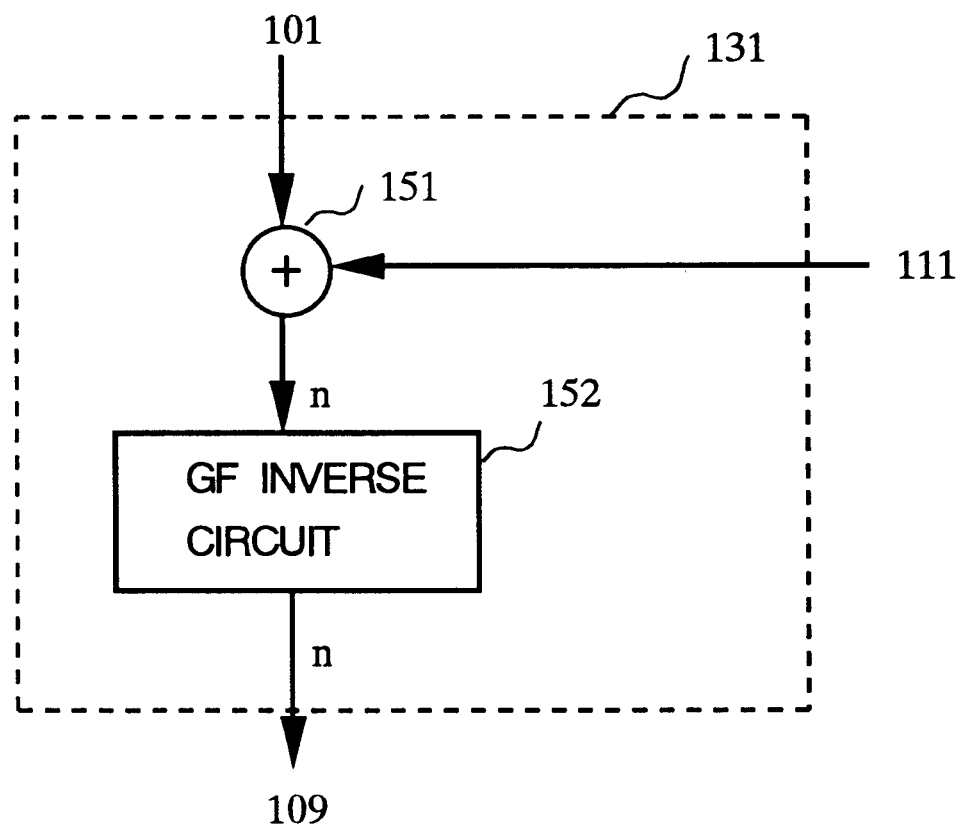
FIG. 2 shows one example of a nonlinear transformer.

FIG. 2 shows one example of conventional nonlinear transformer.

In the figure, 151 denotes an XOR circuit of the nonlinear transformer, 152 denotes a Galois Field inverse circuit. This nonlinear transformer outputs "0" on receiving input 0. n shows bit size of input/output data. When the nonlinear transformer of FIG. 2 is used, it is known that the differential probability "p" becomes $p=2/2^n$ (where "n" is an odd number), or $p=4/2^n$ (where "n" is an even number).

However, the circuit scale of the Galois Field inverse circuit 152 becomes large when the input data size is large.

According to the present invention, a configuration described below also satisfies the above statement (1), which is proved in Document 2: "On Provable Security of Block Ciphers against Differential and Linear Cryptanalysis", (Mitsuru Matsui, Text for the 18th symposium on Information Theory and Its Applications, Oct. 24–27, 1995). The document 2 shows that this invention provides stronger ciphers than the configuration of (1) because $2p^2$ in the above statement (1) can be reduced to $p^2$ even if the nonlinear transformation process is the same as in FIG. 29.

In this embodiment, the data transformation apparatus will be explained, which includes the sub-transformation unit where the differential probability "p" is small and data can be transformed at a high speed.

Figure 1:
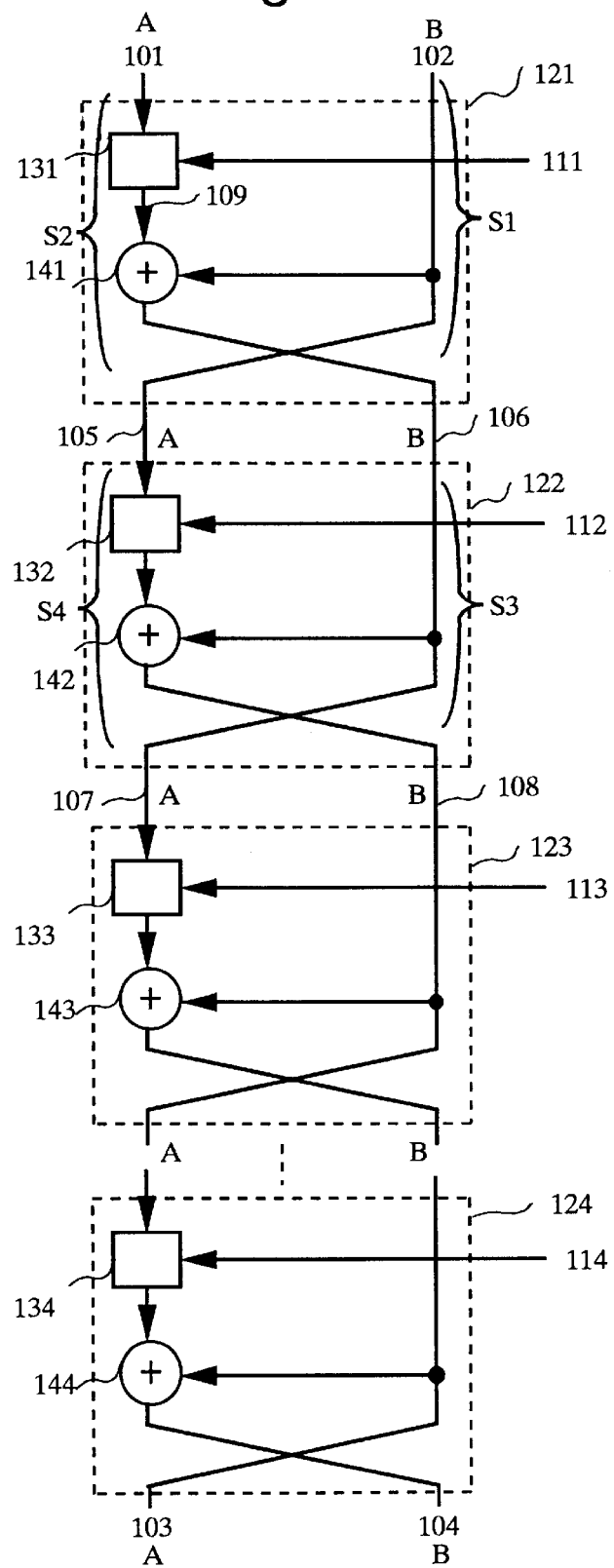
FIG. 1 is a block diagram showing a configuration of a data transformation apparatus according to Embodiment 1.

FIG. 1 shows a configuration of the data transformation apparatus of the present embodiment.

In the figure, 101 and 102 denote A input data and B input data, respectively. 103 and 104 denote A output data and B output data of the last stage, which is data transformation result. 105–108 denote intermediate data, and 111–114 denote key parameters for encryption. 121–124 denote sub-transformation units from the first stage to the n-th stage, including nonlinear transformers 131–134 for the first to the n-th stages, and XOR circuits 141–144.

An operation of the data transformation apparatus of the above configuration will be explained hereinafter. Here, the lengths of two input data are identical. In the data transformation process, it takes time to perform nonlinear transformation. Time required by an XOR operation is short enough to be ignored compared with the nonlinear transformation.

In FIG. 1, a first nonlinear transformation of one of the inputs, A input data 101, is performed using the first key parameter 111 at the XOR circuit 151 and at the Galois Field inverse circuit 152, both of which are shown in FIG. 2. Transformed result 109 is XORed with another input, B input data 102 and the XORed result is output to the next stage as B intermediate data 106 (S2). On the other hand, B input data 102 is output to the next stage without any transformation as the first A intermediate data 105 (S1). A second nonlinear transformation of A intermediate data 105 is performed and the transformed result is XORed with B intermediate data 106 to output B intermediate data 108 (S4). B intermediate data 106 is output to the next stage as A intermediate data 107 without any transformation (S3). In the above operation procedure, the operation of the second nonlinear transformer 132 is performed in parallel with the first nonlinear transformation.

In both of the sub-transformation units of odd-numbered stage and even-numbered stage, nonlinear transformations are performed almost in parallel as described above, which enables high speed data transformation.

In the above explanation of the embodiment, the lengths of two input data are identical. In another case, where the lengths of two input data are different, for example, when A input data includes $n_1$ bits and B input data includes $n_2$ bits ($n_1 > n_2$), the following is proved.

(2) If there are more than three stages of sub-transformations, the differential probability of a whole apparatus becomes less than $p^2$ when nonlinear transformation is performed in the system where the value of output data is determined one by one corresponding to the input data.

Accordingly, in the configuration of FIG. 1, when the lengths of the two input data are different, even though the differential probability "p" of each sub-transformation unit is the same as the above case, the data transformation apparatus can be configured where the differential probability "p" of a whole apparatus is guaranteed to be less than $p^2$. As for inputs to the XOR circuit of the above apparatus, two data with different lengths are input. An excess bits of data (($n_1-n_2$) bits) of A input data is excluded with the XOR operation. Only the same number of bits as B input data ($n_2$ bits) of A input data is XORed with B input data. In another way of operation, for example, ($n_1-n_2$) bits of constants can be concatenated to B input data and B input data with the concatenated part is XORed with A input data. Further, the key parameter is supplied appropriately corresponding to the length of data to be processed when A input data and B input data have different data lengths.

The hardware configuration is aforementioned in this embodiment. It is also possible to perform a nonlinear transformation and an XOR operation using software. And the data transformation apparatus can perform an operation of odd-numbered stage and another operation of even-numbered stage in parallel, which is as effective as the above.

Embodiment 2

Another configuration of a high speed nonlinear transformation, which is a main discussing point of the present invention, will be explained in the following.

Figure 3:
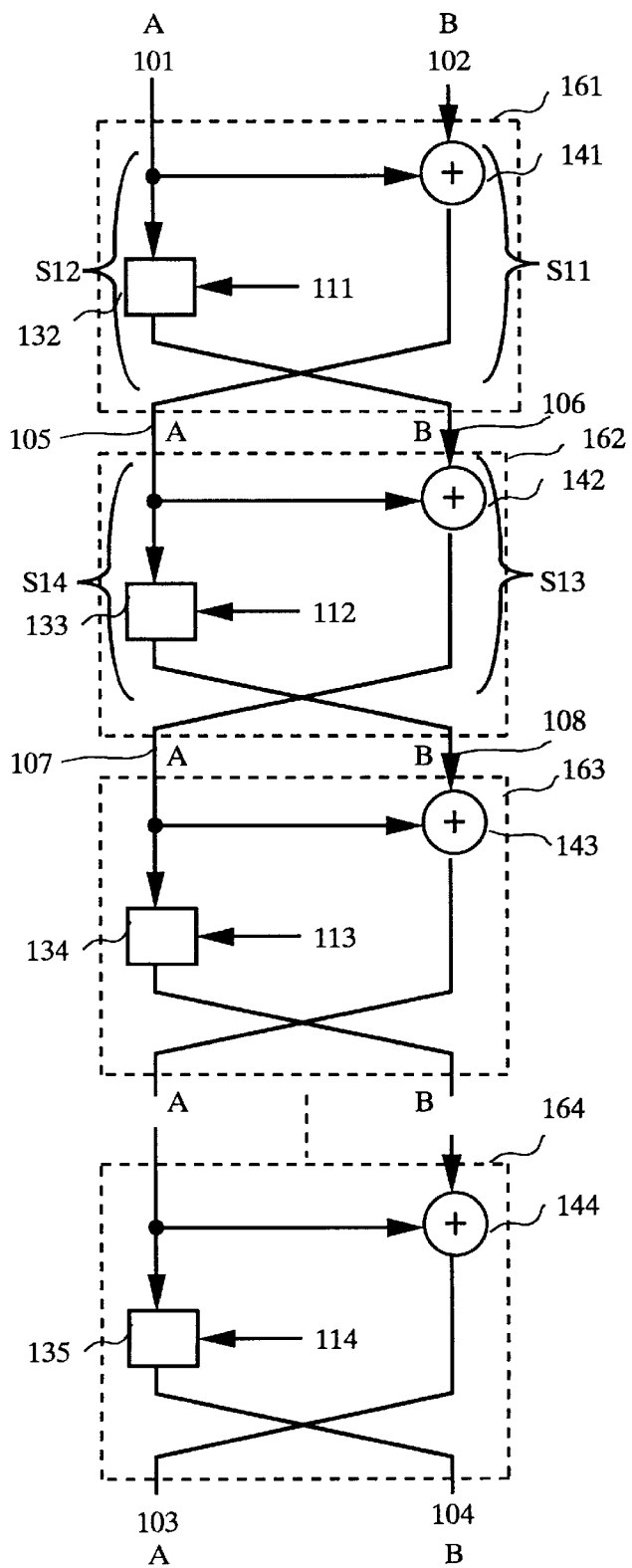
FIG. 3 is a block diagram showing a configuration of a data transformation apparatus according to Embodiment 2.

In this embodiment, a location of the XOR circuit is altered in each sub-transformation unit. FIG. 3 shows a block diagram of this configuration. In the figure, 161–164 denote the first to the fourth sub-transformation units. Key parameters 111–114, nonlinear transformers 132–135, and XOR circuits 141–144 are the same elements as ones of the first embodiment shown in FIG. 1. Internal connections of the sub-transformation units 161–164 are different from the sub-transformation units 121–124 of FIG. 1.

In the data transformation apparatus where elements are connected as described above, the differential probability of a whole apparatus becomes less than $p^2_1$, which is smaller than $2p^2$ as stated in (1), and the apparatus can generate strong cipher.

As for A input data 101 and B input data 102 input to the first sub-transformation unit 161, A input data 101 is non-linearly transformed using the first key parameter 111 at the nonlinear transformer 132, and the transformed result is output as B intermediate data 106 of the first stage (S12). A input data 101 is XORed with B input data 102 at the XOR circuit 141, and the XORed result is output as A intermediate data 105 of the first stage (S11).

A intermediate data 105 output from the first sub-transformation unit 161, is input to the second sub-transformation unit 162. A intermediate data is nonlinearly transformed using the second key parameter 112 at the nonlinear transformer 133, and the transformed result is output as B intermediate data 108 of the second stage (S14).

A intermediate data 105 of the first stage and B intermediate data 106 are XORed at the XOR circuit 142, and the XORed result is output as A intermediate data 107 of the second stage (S13).

The above first and second sub-transformation units are alternately connected. The last stage may be either of the first and the second sub-transformation units as well as the first embodiment.

In the data transformation apparatus connected as described above, the differential probability of a whole apparatus becomes less than $p^2$ according to Document 2, which was explained in the first embodiment. As for operation speed of the circuit, the XOR operation is much faster than the nonlinear transformation. The nonlinear transformation of the first stage and the second stage are thus performed almost in parallel, which increases the processing speed of the data transformation apparatus as a whole.

Figure 4:
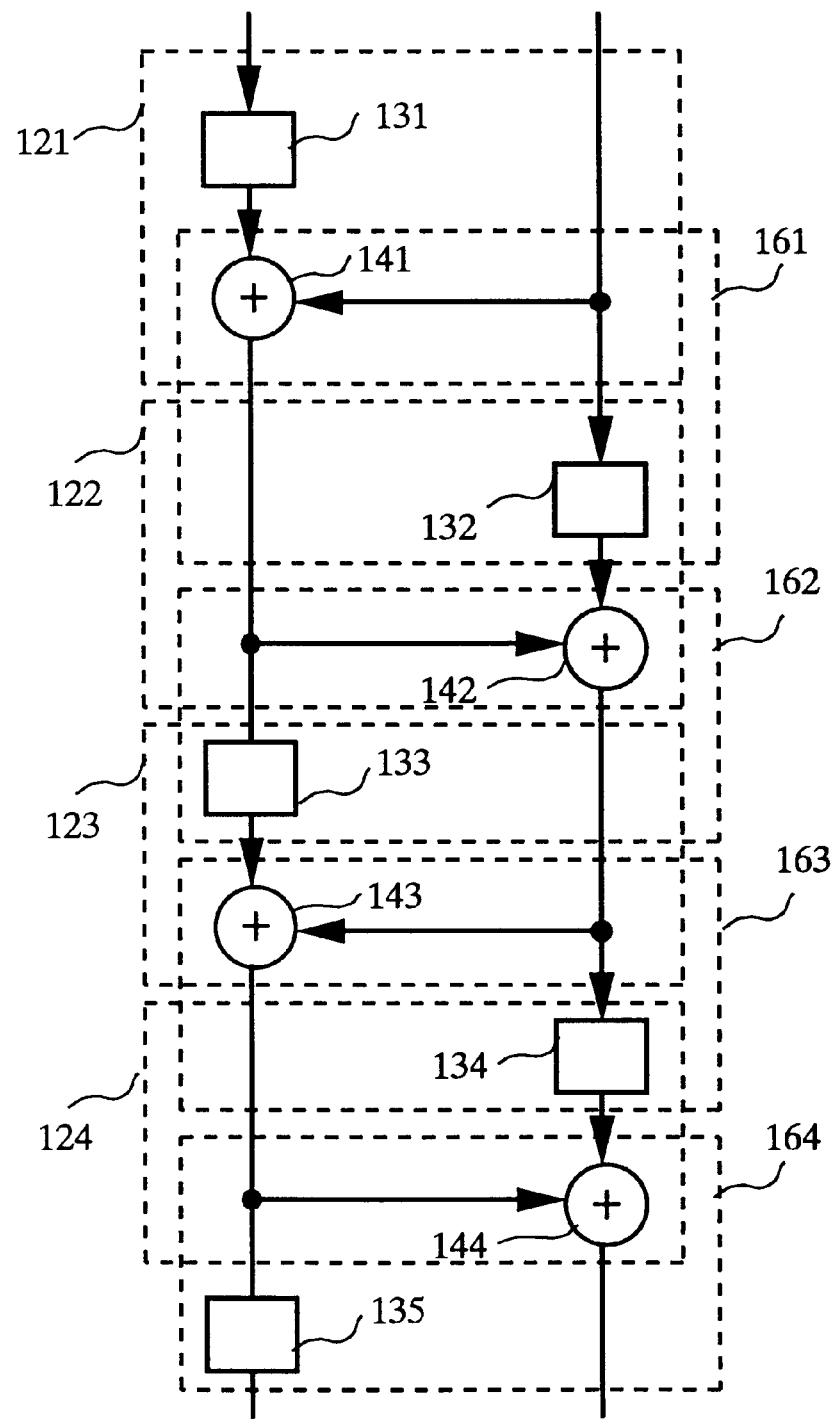
FIG. 4 shows that the data transformation apparatus of the first embodiment is logically identical with the data transformation apparatus of the second embodiment.

In the following, it will be explained referring to FIG. 4 that the configuration of FIG. 1 is substantially the same as the configuration of FIG. 3.

In FIG. 4, 121–124 show the sub-transformation units of FIG. 1. 161–164 show the sub-transformation units of FIG. 3. Both of the sub-transformation units of FIG. 1 and the sub-transformation units of FIG. 3 are included in the configuration of FIG. 4. The difference between FIG. 1 and FIG. 3 is which part of the circuit is defined as a sub-transformation unit. Namely, in FIG. 1, the elements between the input side of the first nonlinear transformer 131 and the input side of the second nonlinear transformer 132 (the first nonlinear transformer 131 and the XOR circuit 141) are defined as the first sub-transformation unit 121. And the elements between the input side of the second nonlinear transformer 132 and the input side of the next first nonlinear transformer 133 (the second nonlinear transformer 132 and the XOR circuit 142) are defined as the second sub-transformation unit 122. In FIG. 3, the elements between the output side of the first nonlinear transformer 131 and the output side of the second nonlinear transformer 132 (the XOR circuit 141 and the second nonlinear transformer 132) are defined as the first sub-transformation unit 161. And the elements between the output side of the second nonlinear transformer 132 and the output side of the next first nonlinear transformer 133 (the XOR circuit 142 and the first nonlinear transformer 133) are defined as the second sub-transformation unit 162.

Figure 5:
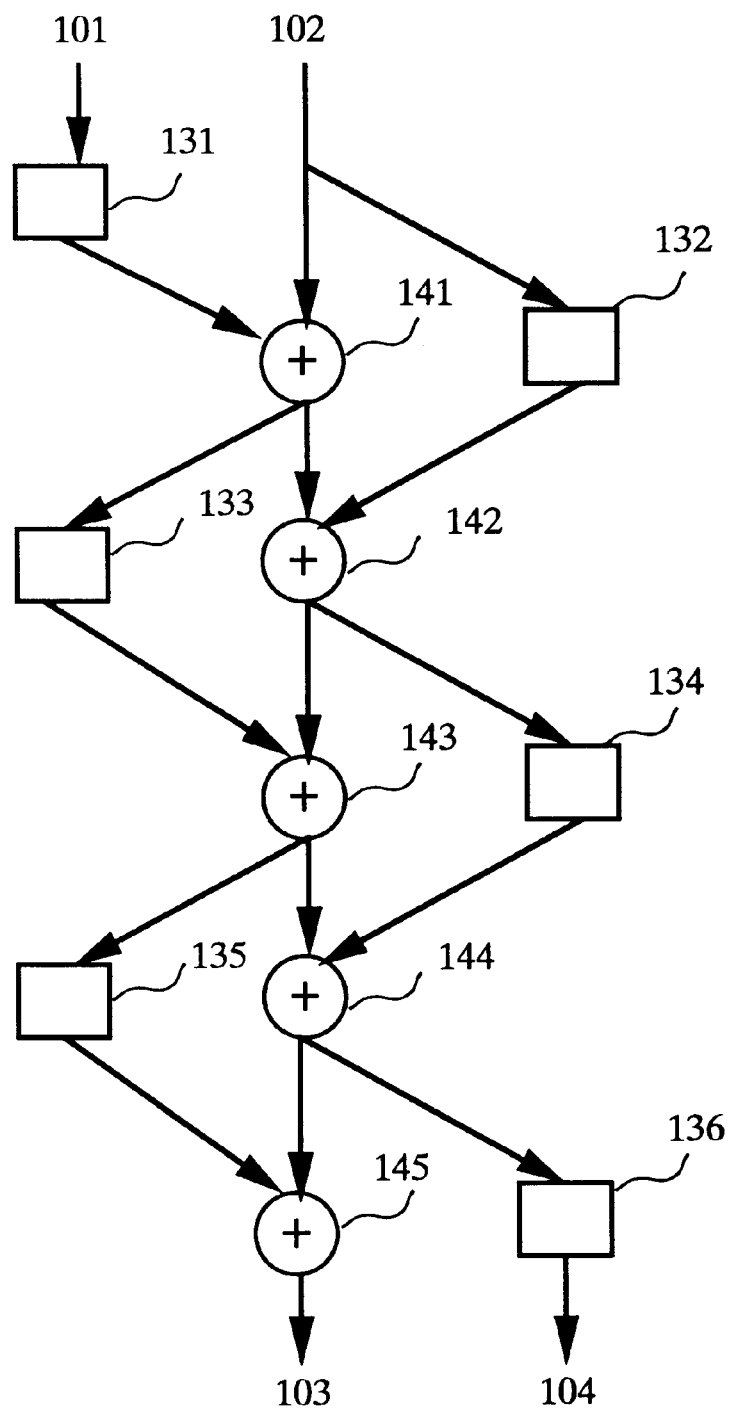
FIG. 5 shows another example of a data transformation apparatus of the same configuration with the data transformation apparatus of the first or the second embodiment.

FIG. 5 shows a configuration of another example of the data transformation apparatus, which is substantially the same as the configurations of FIG. 1 and FIG. 3.

In FIG. 5, the XOR circuits 141–145 are connected in a cascade. That is, the XOR circuits are connected so that the output data from the XOR circuit becomes one of the input data of the next XOR circuit. The nonlinear transformers 131, 133, 135 are connected with the odd-numbered XOR circuits 141, 143, 145, respectively. The nonlinear transformers 132, 134, 136 are connected with the even-numbered XOR circuits 142, 144, respectively.

The data transformation apparatus configured as shown in FIG. 5 is able to process data at a high speed because operations of the first and the second nonlinear transformers 131 and 132, 133 and 134, or 135 and 156 are performed almost in parallel as well as the data transformation apparatus configured as shown in FIGS. 1 and 3.

Embodiment 3

As described in Embodiment 1, in the nonlinear transformer of FIG. 2, when the input/output data size becomes large, the circuit scale also becomes large. In this embodiment, the data transformation apparatus is configured as a nest to make a compact data transformation apparatus using a small-sized nonlinear transformer (e.g., an inverse element circuit).

The FEAL algorithm of the conventional art does not generate strong enough ciphers because the differential probability "p" is large.

In this embodiment, a small-sized nonlinear transformer is used, which makes the circuit scale small and also reduces the differential probability of an entire circuit.

Figure 6:
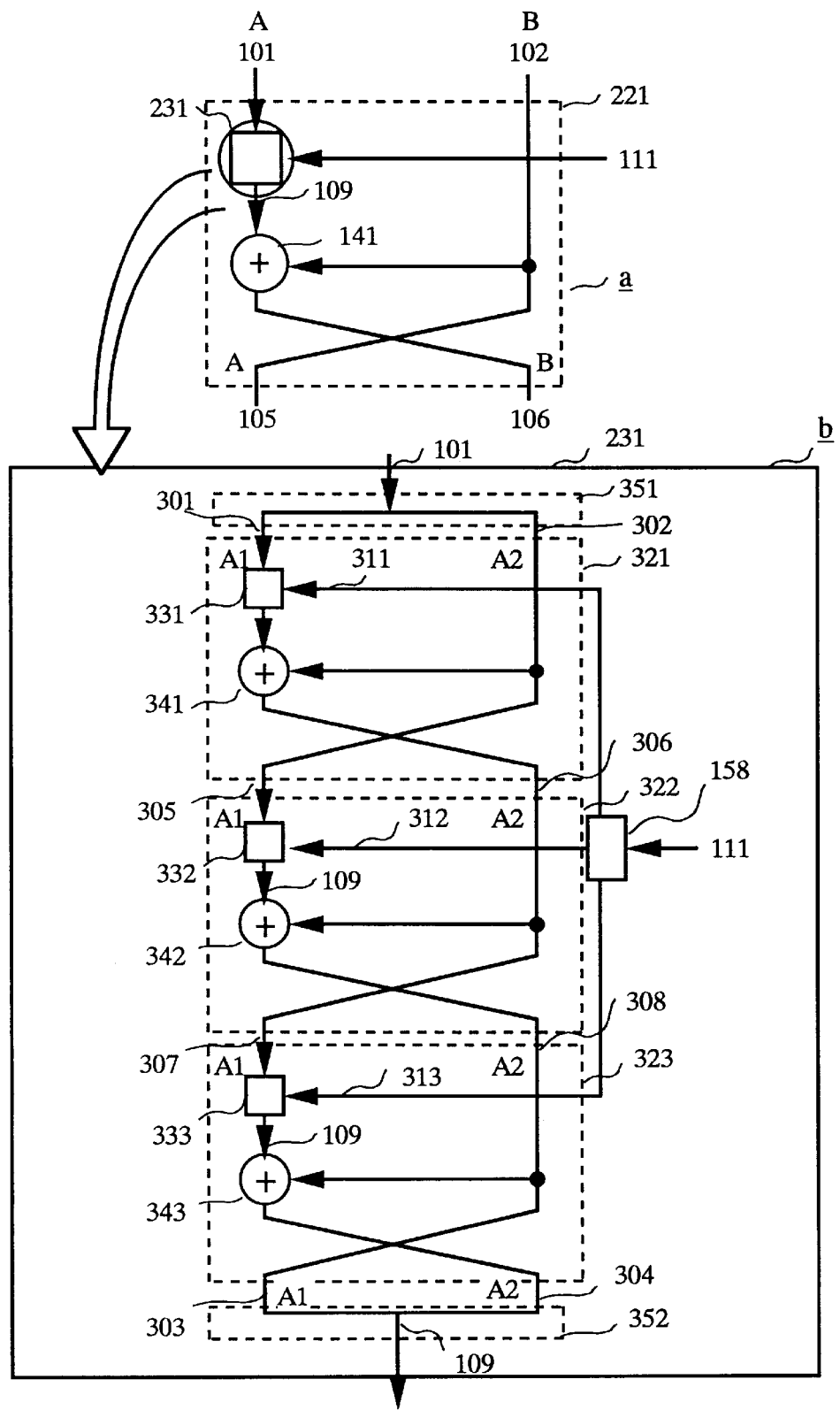
FIG. 6 shows a part of a basic configuration and a nonlinear transformer of a sub-transformation unit of a data transformation apparatus of Embodiment 3.

FIG. 6 shows the sub-transformation unit and the nonlinear transformer located inside of the sub-transformation unit.

In FIG. 6, "a" shows the sub-transformation unit of the first stage, 221 shows the external sub-transformation unit, and 231 shows the external nonlinear transformer of it. "b" shows a detailed configuration of the above external nonlinear transformer 231. An internal division unit 351 divides A input data 101 into two pieces of data, A1 input data 301 and A2 input data 302. 303–308 denote internal intermediate data and 311–313 denote divided key parameters of the key parameter 111. An internal unite unit 352 unites the internal intermediate data 303 and the internal intermediate data 304. 321 and 322 show internal sub-transformation units, 331–333 show internal nonlinear transformers, and 341–343 show internal XOR circuits. A key parameter supply unit 158 divides the key parameter 111.

For example, in the algorithm shown in FIG. 6, when the internal nonlinear transformers 331, 332 and 333 having differential probability "p" are used, the differential probability of the external nonlinear transformer 231 becomes less than $p^2$. Accordingly, the differential probability of the algorithm which includes more than three stages of the external sub-transformation units 221 becomes less than $(p^2)^2 = p^4$.

Figure 7:
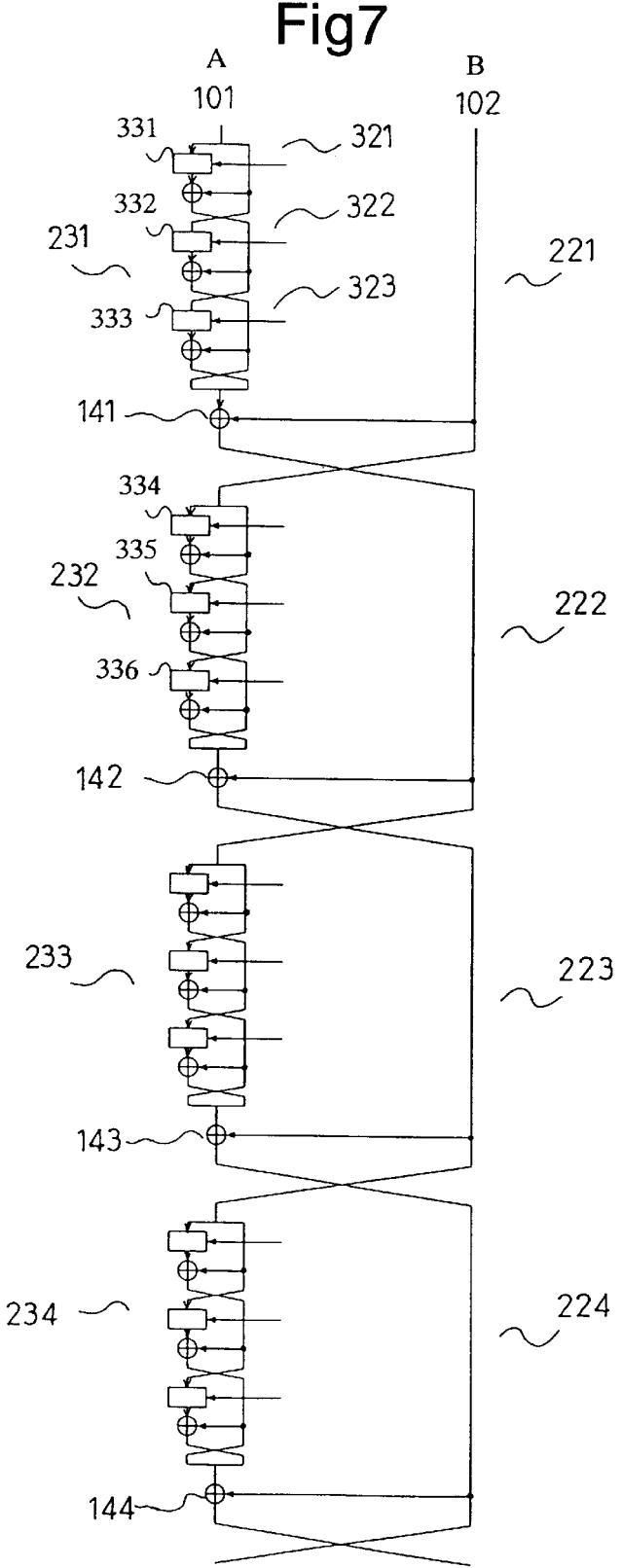
FIG. 7 shows a whole cascaded configuration of the data transformation apparatus of the third embodiment.

FIG. 7 shows a whole configuration of the sub-transformation unit where four stages of the external sub-transformation units shown as "a" of FIG. 6. are connected and each of the external sub-transformation units includes the nonlinear transformers shown as "b" of FIG. 6 having three stages of the internal sub-transformation units.

In the figure, only representative elements are indicated by reference numerals: the external sub-transformation units 221–224, the external nonlinear transformers 231–234, the XOR circuits 141–144 of the external sub-transformation unit, the internal sub-transformation units 321–323, the internal nonlinear transformers 331–336 of the first and the second external nonlinear transformers 231 and 232.

Figure 8:
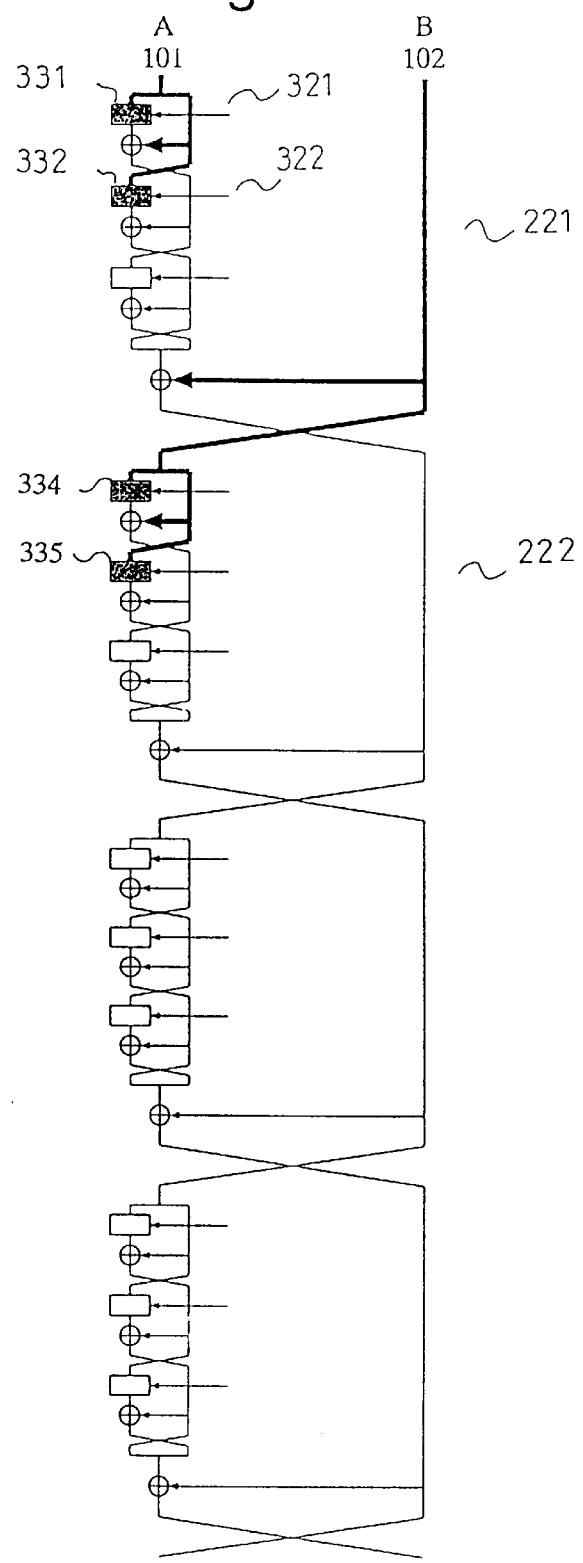
FIG. 8 shows transformation procedure of the apparatus of FIG. 7.
Figure 9:
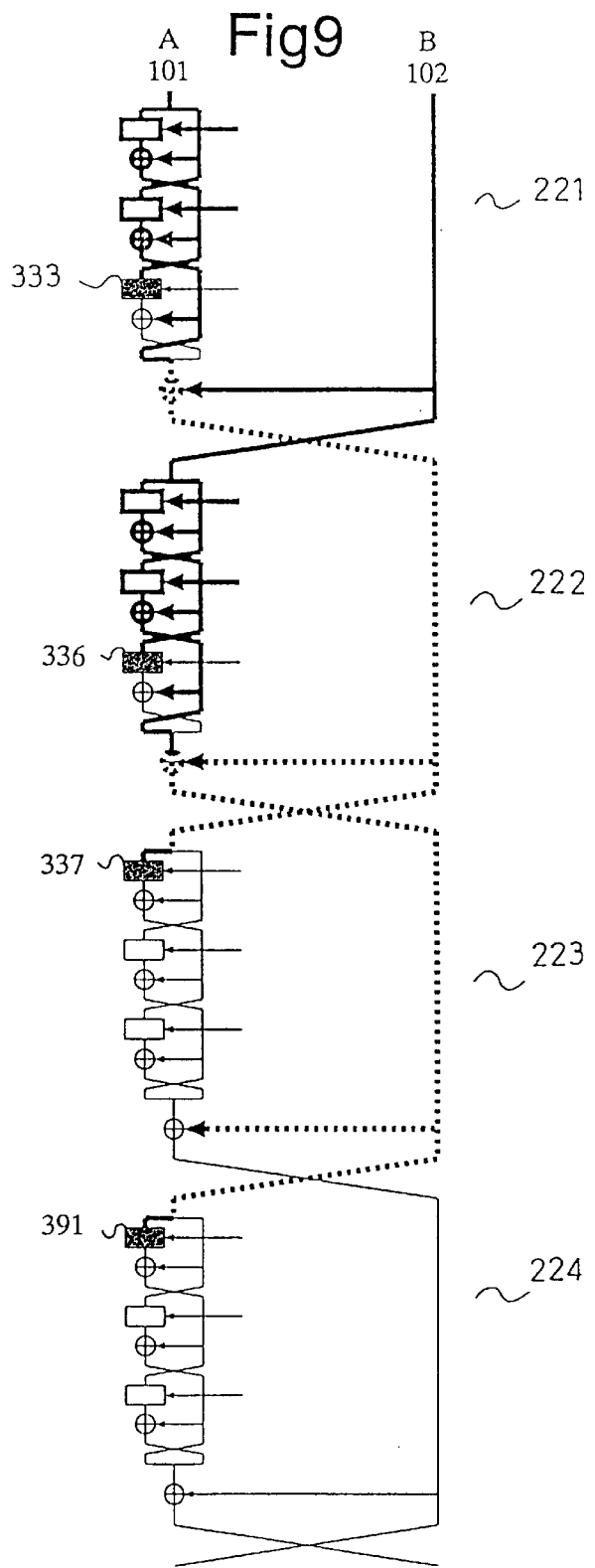
FIG. 9 shows the transformation procedure of the apparatus of FIG. 7.
Figure 10:
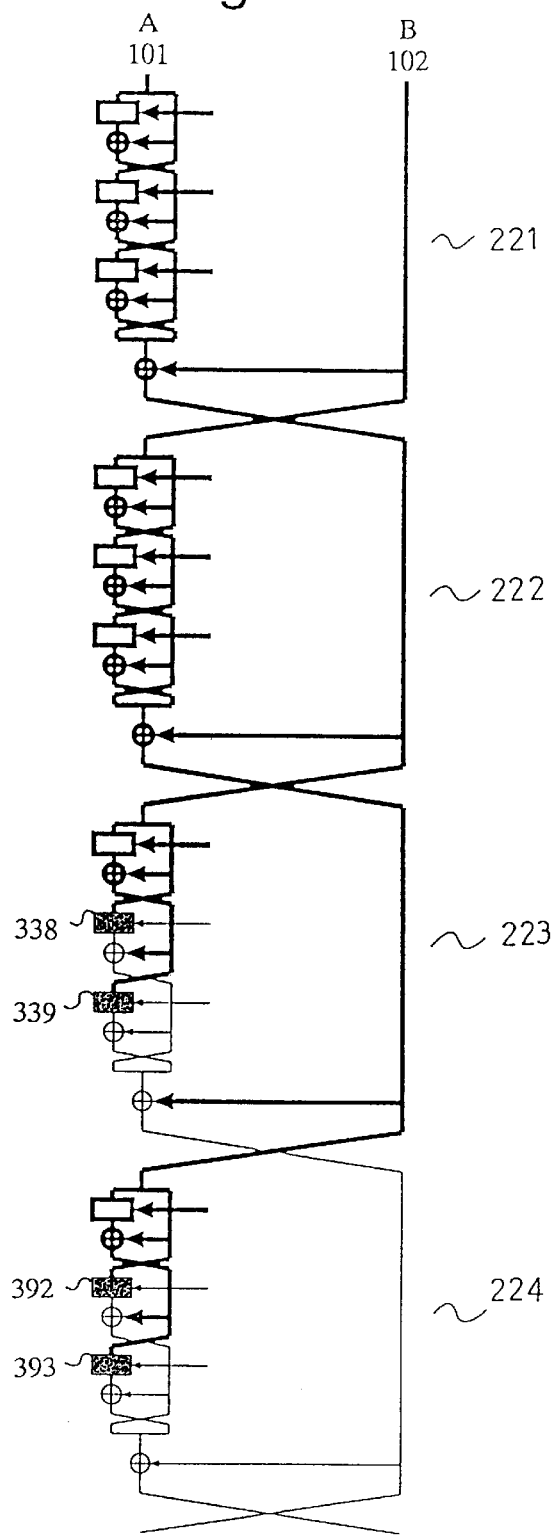
FIG. 10 shows the transformation procedure of the apparatus of FIG. 7.

FIGS. 8–10 show sequential data transforming procedure of the data transformation apparatus configured as shown in FIG. 7.

In the following, an operation of the external nonlinear transformer 231 will be explained referring to FIG. 6.

The internal division unit 351 divides A input data 101 received at the external sub-transformation unit 221 by an arbitrary number of digits into two pieces of data, A1 input data 301 and A2 input data 302. The key parameter supply unit 158 divides the key parameter 111 by an arbitrary number of digits into "n" number of divided key parameters. The key parameter supply unit 158 supplies the divided key parameters as the first divided key parameter 311 to the n-th divided key parameter 313. In the first internal sub-transformation unit 321, an internal nonlinear transformation of A1 input data 101, the divided data of A input data 101, is performed using the first divided key parameter 311. The transformed data is XORed with the A2 input data 302 and the XORed result is output as the first A2 internal intermediate data 306. The A2 input data is output as the first A1 internal intermediate data 305 without any transformation.

The first A1 internal intermediate data 305 of the first internal sub-transformation unit 321 is input to the second internal sub-transformation unit 322 as A1 input. An internal nonlinear transformation of the first A1 internal intermediate data 305 is performed using the second divided key parameter 312. The transformed data is XORed with the A2 input data, that is, the first A2 internal intermediate data 306. The XORed result is output as the second A2 internal intermediate data 308 and the first A2 internal intermediate data 306 is output as the second A1 internal intermediate data 307 without any transformation. The above first internal sub-transformation unit and the above second internal sub-transformation unit are alternately connected up to "n" stages. A1 internal intermediate data 303 and the A2 internal intermediate data 304 of the last stage are united by the internal unite unit 352 and the result is output as the transformation result 109.

An operation of the data transformation apparatus of FIG. 7 configured as described above will be explained hereinafter.

In the first cycle, both A input data 101 and B input data 102 are input and processed as shown in FIG. 8. It takes time to perform a nonlinear transformation, so that most of time period required by the first cycle is consumed by the operations of the internal nonlinear transformers 331, 332 of the external sub-transformation unit 221 and the internal nonlinear transformers 334, 335 of the external sub-transformation unit 222. Namely, data is supplied inside of the data transformation apparatus in the first cycle as shown by the bold line in FIG. 8 and the operations are performed in the internal nonlinear transformers 331, 332, 334 and 335.

In the next cycle, the operations are performed as shown in FIG. 9. Namely, most of time period of the second cycle is consumed by the internal nonlinear transformer 333 of the first external sub-transformation unit 221, the internal nonlinear transformer 336 of the second external sub-transformation unit 222, the internal nonlinear transformer 337 of the third external sub-transformation unit 223, and the internal nonlinear transformer 391 of the fourth external sub-transformation unit 224. In the figure, the bold broken line shows transmission of the data of the A input side.

In the next cycle, the operations are performed as shown in FIG. 10. Namely, most of time period of this cycle is consumed by the other internal nonlinear transformers 338, 339 and 392, 393 of the third and the fourth external sub-transformation units 223 and 224. The operations of the whole data transformation procedure is completed by these three cycles. In the conventional system, data is transformed sequentially, that is, the nonlinear transformation of each stage is started after the nonlinear transformation of the previous stage has been finished. In this conventional data transformation case, the conventional data transformation procedure requires 12 cycles. Namely, the data transformation apparatus of this embodiment can process data about four times as high speed as the conventional data transformation apparatus.

In the data transformation apparatus of this embodiment, a nonlinear transformer of Embodiment 1 is used for the nonlinear transformers 331–393, having a nest configuration in the sub-transformation units. A nonlinear transformer of Embodiment 2, which is also configured as a nest, can be used as well. The same effect can be obtained as the above nonlinear transformer of Embodiment 1.

Embodiment 4

In this embodiment, a small-sized nonlinear transformer is applied to the nonlinear transformer in the conventional sub-transformation unit.

Figure 11:
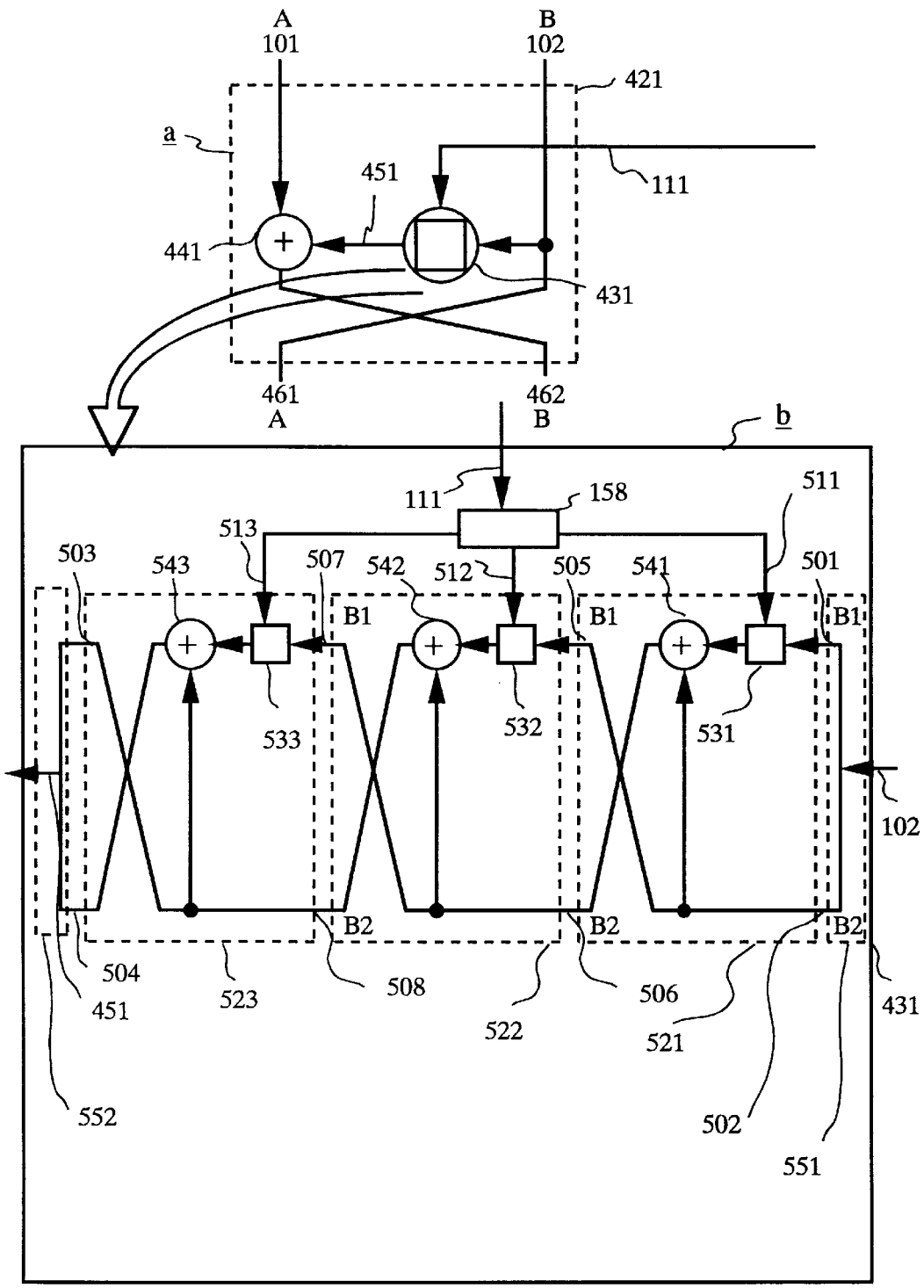
FIG. 11 shows a part of a basic configuration and a nonlinear transformer of a sub-transformation unit of a data transformation apparatus of Embodiment 4.
Figure 12A:
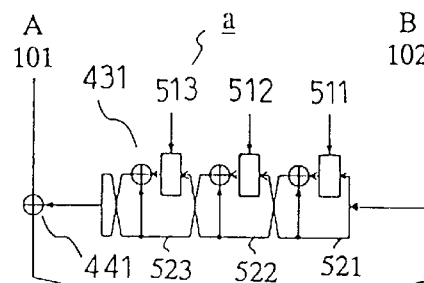
FIG. 12 shows a part of cascaded sub-transformation units and a data transformation procedure of the data transformation apparatus of the fourth embodiment.
Figure 12B:
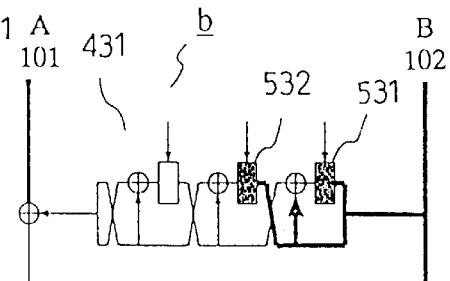
Figure 12C:
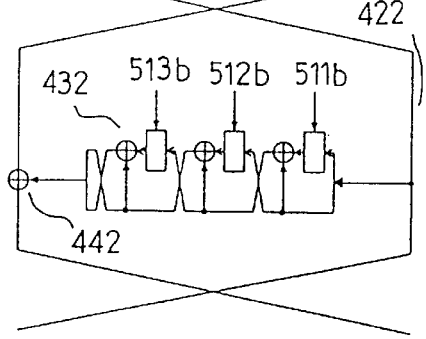
Figure 12D:
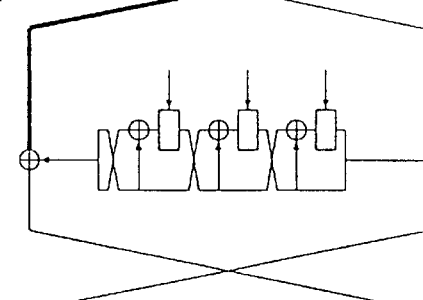

FIG. 11 shows the sub-transformation unit and the detailed configuration of the nonlinear transformer inside of the sub-transformation unit.

In FIG. 11, "a" shows the sub-transformation unit of the first stage. 421 denotes an external sub-transformation unit and 431 denotes an external nonlinear transformer. In FIG. 11, "b" shows a detailed configuration of the external nonlinear transformer 431, 551 shows an internal division unit and 501–508 denote input data. 511–513 denote divided key parameters of the key parameter 111. 552 shows an internal unite unit, 521–523 show internal sub-transformation units, 531–533 show internal nonlinear transformers, and 541–543 denote XOR circuits.

In algorithm shown in FIG. 11, when the internal nonlinear transformers 531, 532, 533 have the differential probability "p", the differential probability of the external nonlinear transformer 431 is less than $p^2$. Accordingly, when the algorithm includes more than three stages of the external sub-transformation unit 421, the differential probability of the algorithm becomes less than $2(p^2)^2=2p^4$.

In FIG. 12, "a" shows a general configuration of the sub-transformation unit, where two stages of the external sub-transformation units shown as "a" in FIG. 11 are connected. The internal sub-transformation unit having three stages shown as "b" in FIG. 11 is used for the nonlinear transformer of each external sub-transformation unit. FIG. 12 also shows sequential data transforming procedure of the data transformation apparatus configured as "a".

In the figure, only representative elements are indicated by reference numerals: external sub-transformation units 421 and 422, XOR circuits 441 and 442 of the external sub-transformation units, internal sub-transformation units 521, 522 and 523, and internal nonlinear transformers 531–536 inside of the first and the second internal sub-transformation units. The other elements are not indicated by the reference numerals.

In the following, an operation of the data transformation apparatus configured as described above will be explained.

In the first cycle, A input data 101 and B input data 102 are input and processed as shown as "b" of FIG. 12. It takes time to process data in the internal nonlinear transformers 531 and 532 of the external sub-transformation unit 421. Namely, in the first cycle, the data is processed in the internal nonlinear transformers 531 and 532 and A input data and B input data are transmitted as shown by the bold line in "b" of FIG. 12.

In the next cycle, the data is further processed as shown in "c" of FIG. 12. It takes time to process data in the internal nonlinear transformer 533 of the external sub-transformation unit 421 and the internal nonlinear transformer 534 of the second external sub-transformation unit 422. The bold broken line shows data transmission of the A input side.

In the next cycle, the data is further processed as shown in "d" of FIG. 12. It takes time to process data in the other internal nonlinear transformers 535 and 536 of the second external sub-transformation unit 422. The operations of the whole data transformation procedure is completed by these three cycles. In the conventional system, data is transformed sequentially, that is, the nonlinear transformation of each stage is started after the nonlinear transformation of the previous stage has been finished. In the conventional example, the conventional data transformation procedure requires six cycles. The data transformation apparatus of this embodiment completes the data transformation by three cycles, which means a high speed operation can be realized.

In the above embodiment, the nonlinear transformer shown in Embodiment 1 is used inside of the sub-transformation unit having a nest configuration. The nonlinear transformer shown in Embodiment 2 can be also used for a nest configuration in the same way, which attains the same effect.

Embodiment 5

Another data transformation apparatus, where a nonlinear transformer, being a basic element of the configuration of the present invention, is applied to a nonlinear transformer inside of the conventional sub-transformation unit.

Figure 13A:
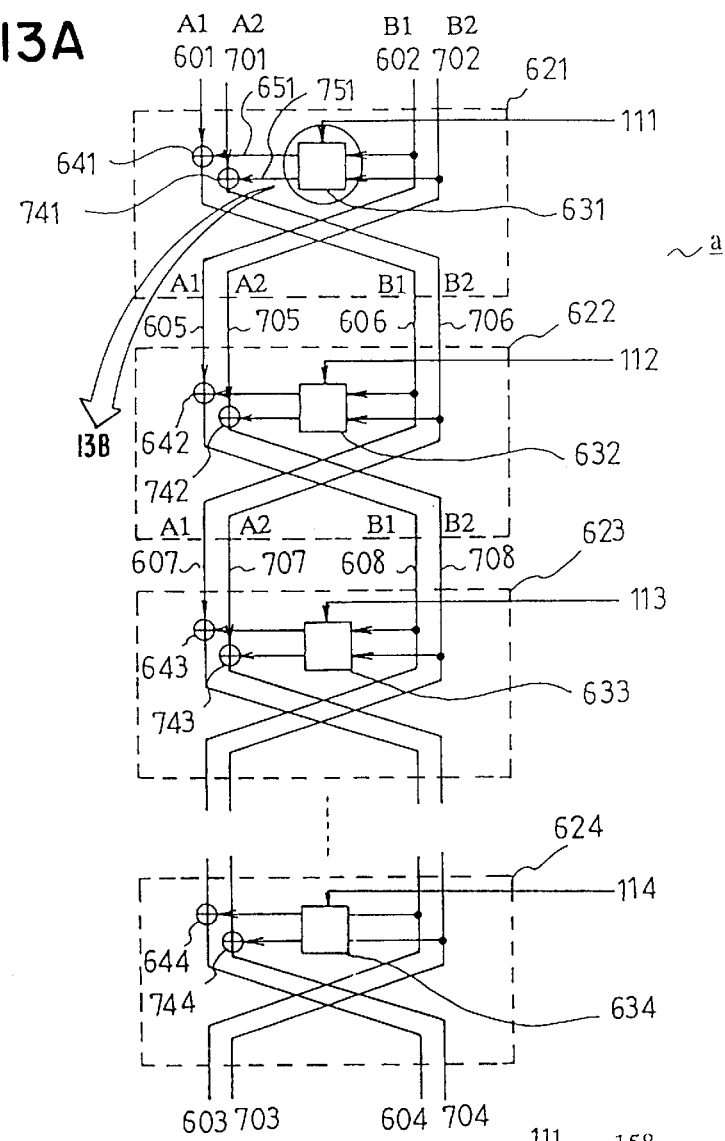
FIG. 13 shows a basic configuration and a nonlinear transformer of the sub-transformation unit of a data transformation apparatus of Embodiment 5.
Figure 13B:
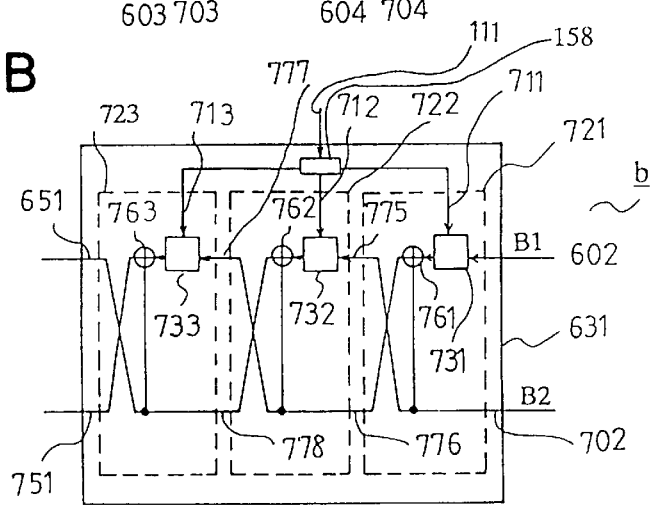

FIG. 13 shows a configuration of this data transformation apparatus and the nonlinear transformer inside of the sub-transformation unit.

In FIG. 13, "a" shows a general configuration, 621–624 denote external sub-transformation units, 631–634 denote external nonlinear transformers inside of the external sub-transformation units, and 641–644 and 741–744 denote XOR circuits. 601, 602, 701, 702 denote A1, B1, A2, B2 input data, respectively. 603, 604, 703, 704 denote output data after transformation. 605–608, 705–708 denote intermediate data. In FIG. 13, "b" shows a detailed configuration of the external nonlinear transformer 631. 651, 751 are data after nonlinear transformation, 775–778 denote internal intermediate data, and 711–713 denote divided key parameters of the key parameter 111. 721–723 denote internal sub-transformation units, 731–733 denote internal nonlinear transformers, and 761–763 denote XOR circuits.

The data transformation apparatus of FIG. 13 inputs four arbitrary pieces of data, A1 input data, A2 input data, B1 input data, and B2 input data. In each sub-transformation process, a nonlinear transformation and an XOR operation are performed each of between A1 input data and B1 input data, and between A2 input data and B2 input data. Transformed result is output as B1 intermediate data and B2 intermediate data. B1 input data and B2 input data become A1 intermediate data and A2 intermediate data without any transformation.

An operation of the above data transformation apparatus is the same way as the data transformation apparatuses of Embodiments 3 and 4, which is described above in detail, and is not explained here. The data transformation apparatus of this embodiment improves an operating speed of the apparatus.

Embodiment 6

In this embodiment, the first sub-transformation unit 121 and the second sub-transformation unit 122 are paired as a basic operation unit. The data transformation process in Embodiment 1, which was performed by the plural first sub-transformation units 121 and the plural second sub-transformation units 122 alternately connected, is performed by repeating the operation of the above basic operation unit. Namely, one operation unit is configured by the first sub-transformation unit 121 and the second sub-transformation unit 122, the operations of which can be performed repeatedly. At the end of the operation performed by this operation unit, the output from the second sub-transformation unit is stored and is supplied as the next input data to the first sub-transformation unit. The operation of the operation unit can be thus repeated, which reduces the scale of the hardware.

Figure 14:
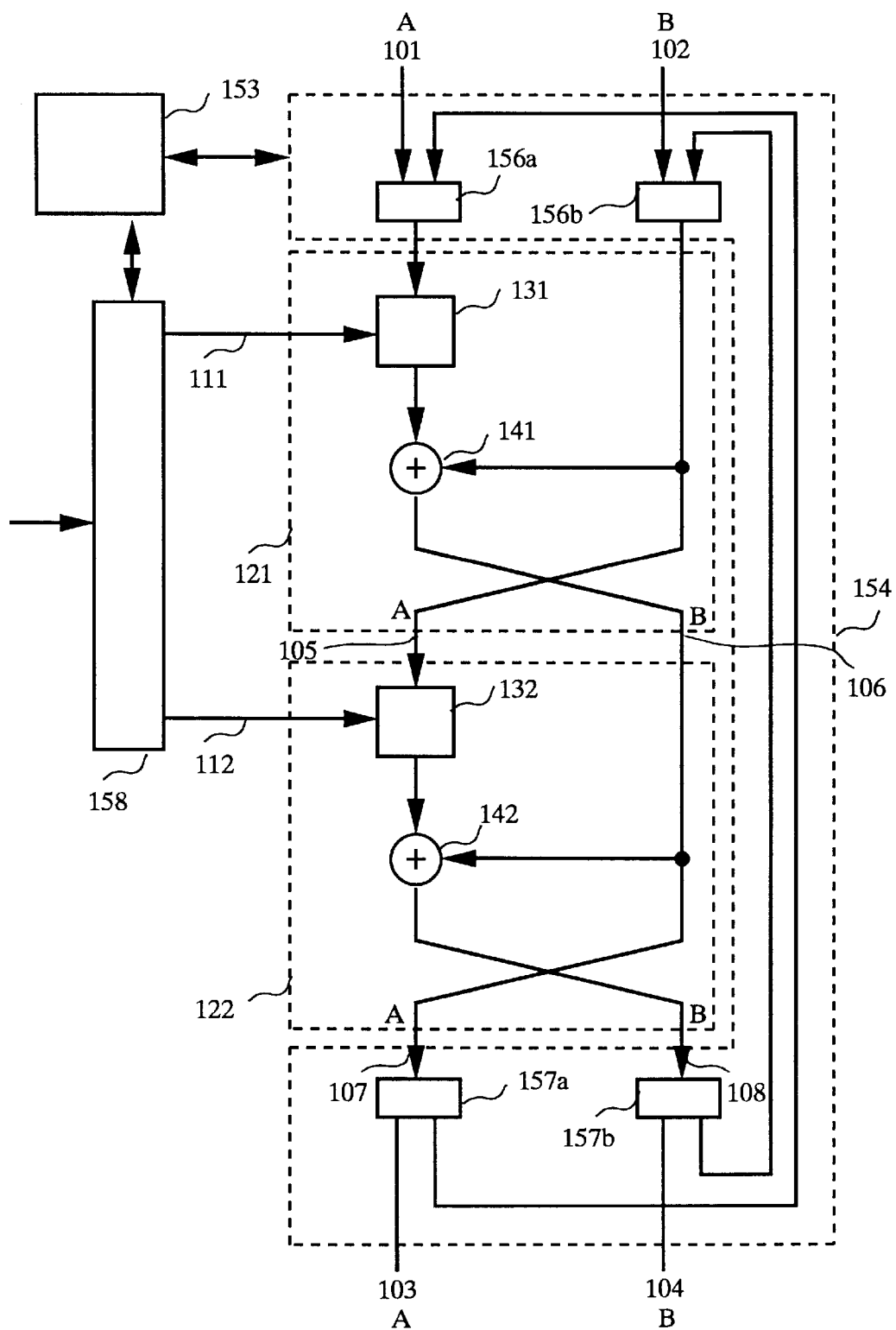
FIG. 14 is a block diagram showing a configuration of a data transformation apparatus of Embodiment 6.

FIG. 14 is a block diagram showing the above configuration. In the figure, 121 and 122 show the first and the second sub-transformation units, respectively. 111 and 112 show the first and the second key parameters. The nonlinear transformers 131 and 132, XOR circuits 141 and 142 are the same as ones of FIG. 1 of Embodiment 1. 153 denotes a control unit, 154 denotes a repeating unit, 156a and 156b are data selecting units, 157a and 157b are data holding units, and 158 denotes a key parameter supply unit.

The following is an operation of the above data transformation apparatus.

Arbitrary A input data 101 and B input data 102 are input to the first sub-transformation unit 121 via the data selecting units 156a and 156b. Next, A intermediate data 105 and B intermediate data 106 are input to the second sub-transformation unit 122. The operation of the first and the second sub-transformation units are the same as ones of Embodiment 1. The key parameter supply unit 158 supplies parameters, being suitable to each of the first and the second sub-transformation units, to the nonlinear transformers of the first and the second sub-transformation units for repeating process, which will be explained below. A intermediate data 107 and B intermediate data 108 output from the second sub-transformation unit 122 are input to the data holding units 157a and 157b. The data are then transmitted to the data selecting units 156a and 156b through the repeating unit 154, and thus input to the first sub-transformation unit 121 as A input data and B input data. Then, the above process is repeated to finally output A output data 103 and B input data 104.

The data transformation apparatus of this embodiment can transform data at a high speed as well as Embodiment 1. The number of the sub-transformation units is decreased, which reduces the scale of the apparatus.

In the above embodiment, a set of one stage of the first sub-transformation unit 121 and one stage of the second sub-transformation unit 122 is defined as a basic operation unit for repeating. In another way, one set of the first sub-transformation unit and the second sub-transformation unit is connected necessary number of times and may be defined as an operation unit for repeating.

In a configuration of FIG. 14, a set of the first sub-transformation unit and the second sub-transformation unit is defined as a unit for connecting in a cascade. The data transformation apparatus thus always includes an even number of sub-transformation units. Thus, proper transformation can be done even if A input data and B input data have different numbers of digits of the data. For example, A input data having 7 digits and B input data having 9 digits are used. The key parameter supply unit 158 supplies the key parameter 111 for 7 digits data to the nonlinear transformer 131 and the key parameter supply unit 158 supplies the key parameter 112 for 9 digits data to the nonlinear transformer 132. The A input data 101 of 7 digits is nonlinearly transformed at the nonlinear transformer 131 using the key parameter 111 for 7 digits into B intermediate data 106 of 7 digits and thus is output as A intermediate data 107. This A intermediate data 107 is transmitted through the data holding unit 157a and the data selecting unit 156a, and becomes A input data again. In this way, there should be an even number of the sub-transformation units so that the A input data having 7 digits is always transformed using the key parameter 111 for 7 digits. If there are an odd number of the sub-transformation units in the nonlinear transformer 131, data of 7 digits and data of 9 digits are nonlinearly transformed alternately.

An odd number of the sub-transformation units can be connected in a cascade if the key parameter supply unit 158 can alternately supply the key parameter for 7 digits data and the key parameter for 9 digits data (this case is not shown in the figure).

Embodiment 7

In this embodiment, the process performed by the data transformation apparatus of Embodiment 2, which is configured by plural first sub-transformation units 161 and plural second sub-transformation units 162 alternately connected, is now performed by repeating operation of the basic operation unit of one first sub-transformation unit and one second sub-transformation unit. Namely, a feedback loop is formed as described in Embodiment 6, so that A intermediate data and B intermediate data is returned to the data selecting unit of the inputting side to be processed again. Thus, the circuit scale can be reduced.

Figure 15:
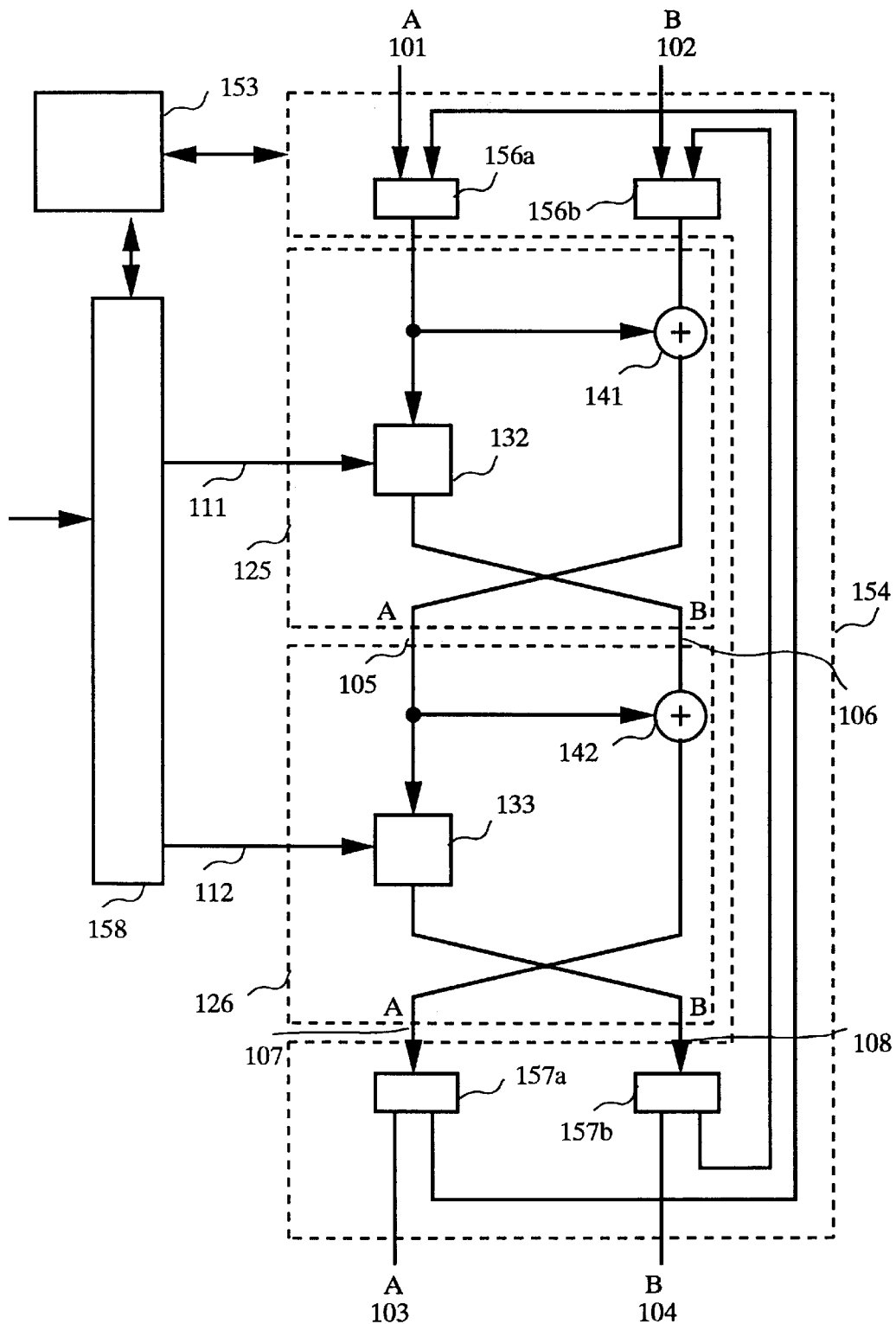
FIG. 15 is a block diagram showing a configuration of a data transformation apparatus of Embodiment 7.

FIG. 15 is a block diagram showing the above configuration. In the figure, 125, 126 show the first sub-transformation unit and the second sub-transformation unit, respectively. 111, 112 show the first and the second key parameter, respectively. The nonlinear transformers 132–133, XOR circuits 141–142 are the same as ones in FIG. 3 of Embodiment 2. The control unit 153, the repeating unit 154, the data selecting units 156a, 156b, the data holding units 157a, 157b, and the key parameter supply unit 158 are the same as ones in Embodiment 6.

The following will be an operation of the data transformation apparatus configured as described above.

Arbitrary A input data 101 and B input data 102 are input to the first sub-transformation unit 125 via the data selecting units 156a, 156b. Next, A intermediate data 105 and B intermediate data 106 are input to the second sub-transformation unit 126. The operations of the first and the second sub-transformation units are the same as in Embodiment 2. The key parameter, which is to be supplied to the first and the second sub-transformation units corresponding to the repeating process described below, is supplied to the nonlinear transformers of the first and the second sub-transformation units by the key parameter supply unit 158. A intermediate data 107 and B intermediate data 108 output from the second sub-transformation unit 126 are transmitted through the data holding units 157a, 157b, the data selecting units 156a, 156b of the repeating unit 154 to be input to the first sub-transformation unit 125 as A input data and B input data, respectively. After the above repeating process, A output data 103 and B output data 104 is finally output.

The data transformation can be performed at a high speed by the above configuration because of the same reason as Embodiment 2, further, the number of sub-transformation units can be decreased, and the circuit scale can be reduced.

In the above explanation of the operation, one stage of the first sub-transformation unit 125 and one stage of the second sub-transformation unit 126 are connected in a cascade to form the operation unit for repeating. In another way, the first sub-transformation unit 125 and the second sub-transformation unit 126 are paired and a necessary number of stages are connected in a cascade to form the operation unit for repeating, which is the same as in Embodiment 6. For another example, though a detailed configuration of which is not shown in the figure and an operation of which is not specified here, an even number of stages of the external sub-transformation units of Embodiment 4 or 5 can be replaced by the operation unit for repeating as well as Embodiment 6 or 7. In this example, the number of the external sub-transformation units can be decreased without reducing the operation speed. Further, in this case, when the operation unit for repeating consists of an even number of external sub-transformation units, a high speed operation can be performed as can be understood by the explanation of Embodiment 4.

The data selecting unit and the data holding unit of Embodiment 6 or 7 are provided as a pair to form a feedback loop. Though a detailed configuration is not shown in the figure and an operation is not specified here, this feedback loop can be applied to the internal sub-transformation units of Embodiments 3–5. Namely, an internal data selecting unit is provided inside of or after the internal division units 351 or 551 of the external nonlinear transformer shown in FIGS. 6 and 11 for selecting input data. An internal data holding unit is provided inside of or before the internal unite units 352 or 552. The feedback loop can be thus formed including these internal data selecting unit and the internal data holding unit. In another way, the data selecting unit can be provided before the external nonlinear transformer of FIG. 13 for selecting input data. The data holding unit can be provided after the external nonlinear transformer. The feedback loop is formed including the data selecting unit and the data holding unit. In this way, the circuit scale of the internal sub-transformation unit can be reduced without reducing the operation speed.

Embodiment 8

In this embodiment, the process described in Embodiment 1, which was performed by the plural sub-transformation units 121–124, is performed by repeating the basic operation unit for repeating. In this explanation of the embodiment, arbitrary A input data 101 and B input data 102 have identical digits of data. When the numbers of digits of A input data 101 and B input data 102 are identical, the number of sub-transformation units for repeating does not always have to be an even number. The arbitrary number of stages, thus, can be connected to form the feedback loop.

Figure 16:
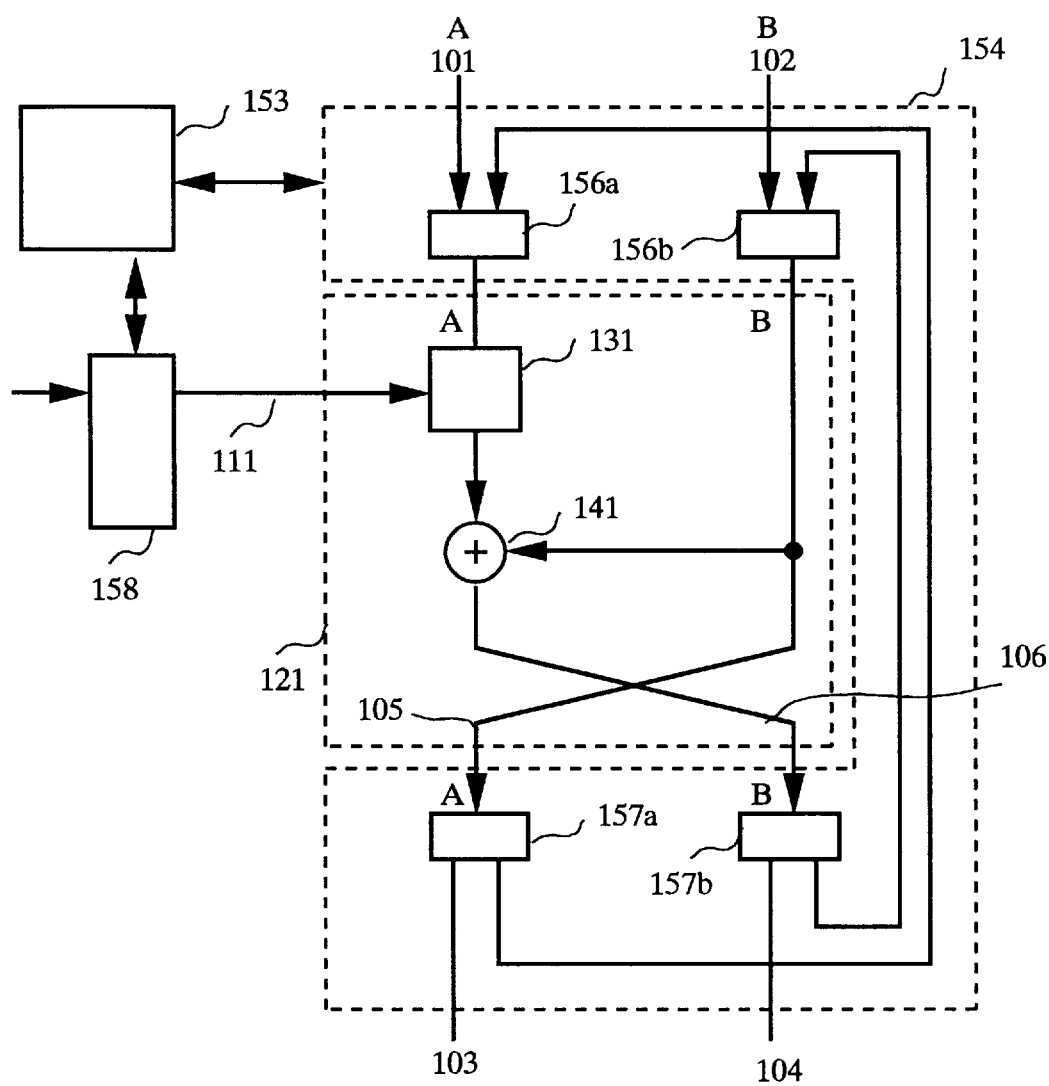
FIG. 16 is a block diagram showing a configuration of a data transformation apparatus of Embodiment 8.

FIG. 16 is a block diagram showing the above configuration. To facilitate the explanation of the operation, the configuration includes only one stage of the sub-transformation unit and it forms the feedback loop in FIG. 16.

In the figure, 121 denotes the sub-transformation unit. The first key parameter 111, the nonlinear transformer 131, the XOR circuit 141, the repeating unit 154, the data selecting units 156a, 156b, the data holding units 157a, 157b, and the key parameter supply unit 158 are the same element as ones in the other embodiments.

The following is an operation of the data transformation apparatus configured above.

Arbitrary A input data 101 and B input data 102 are input to the sub-transformation unit 121 via the data selecting units 156a, 156b. The operation of the sub-transformation unit 121 is the same as Embodiment 1. The key parameter is supplied to the nonlinear transformer of the sub-transformation unit by the key parameter supply unit 158 corresponding to the repeating process described below. A intermediate data 105 and B intermediate data 106, output from the sub-transformation unit 121, are input to the sub-transformation unit 121 as A input data and B input data, respectively, by the repeating unit 154. Hereafter, the above process is repeated to finally output A output data 103 and B output data 104.

By the above configuration, the number of nonlinear transformers can be decreased and the scale of the apparatus also can be reduced.

In the above explanation of the embodiment, the operation unit for repeating includes only one stage of the sub-transformation unit 121. It is possible that the operation unit for repeating includes plural stages of the sub-transformation units connected in a cascade. The operation speed cannot be decreased and the scale of the apparatus can be reduced.

In another way, the sub-transformation unit can be replaced by the sub-transformation unit of the data transformation apparatus specified in Embodiment 2.

Further, this embodiment can be applied to the internal sub-transformation unit of Embodiments 3–5 as well as Embodiments 6 and 7, though a detailed configuration of this case is not shown in the figure and an operation is not specified here.

Embodiment 9

In the present embodiment, a small-sized nonlinear transformer is applied to a nonlinear transformer of a conventional sub-transformation unit.

Figure 17:
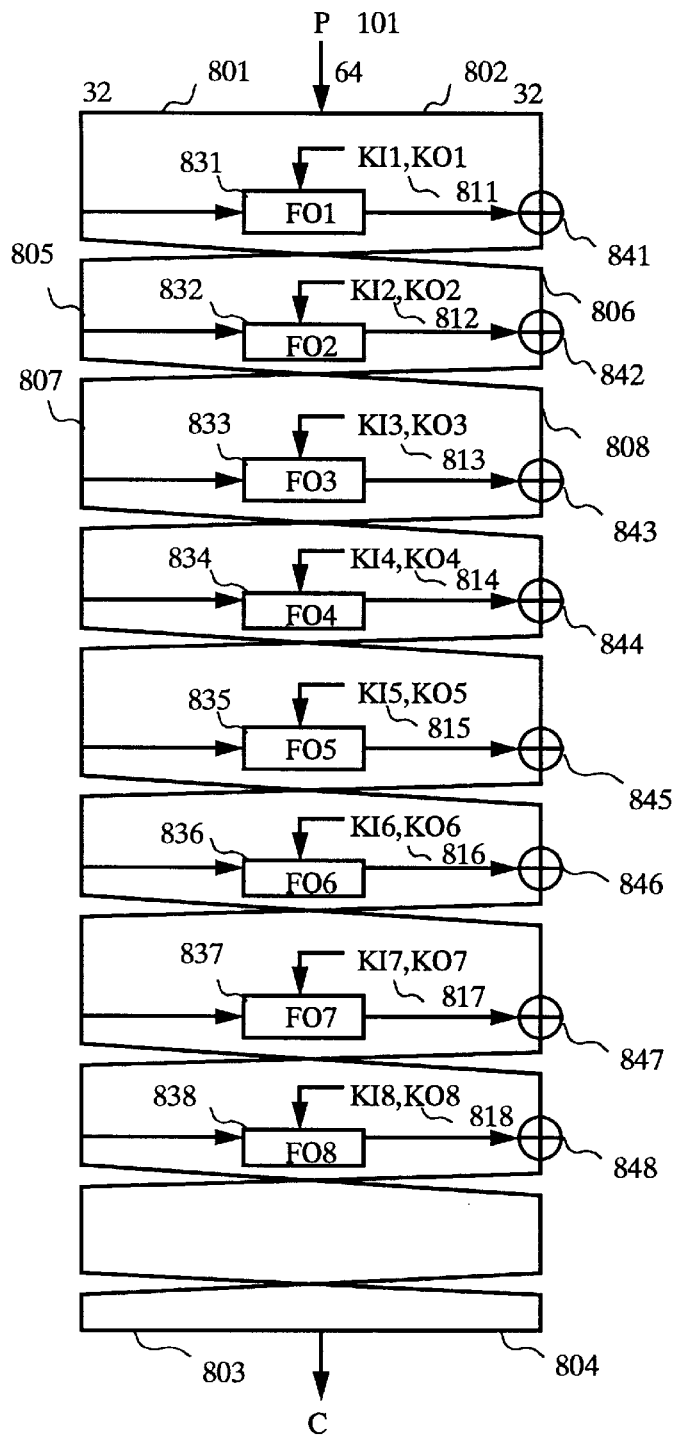
FIG. 17 is a block diagram showing a configuration of a data transformation apparatus of Embodiment 9.

FIG. 17 shows a configuration of a data transformation apparatus of the present embodiment.

Figure 18:
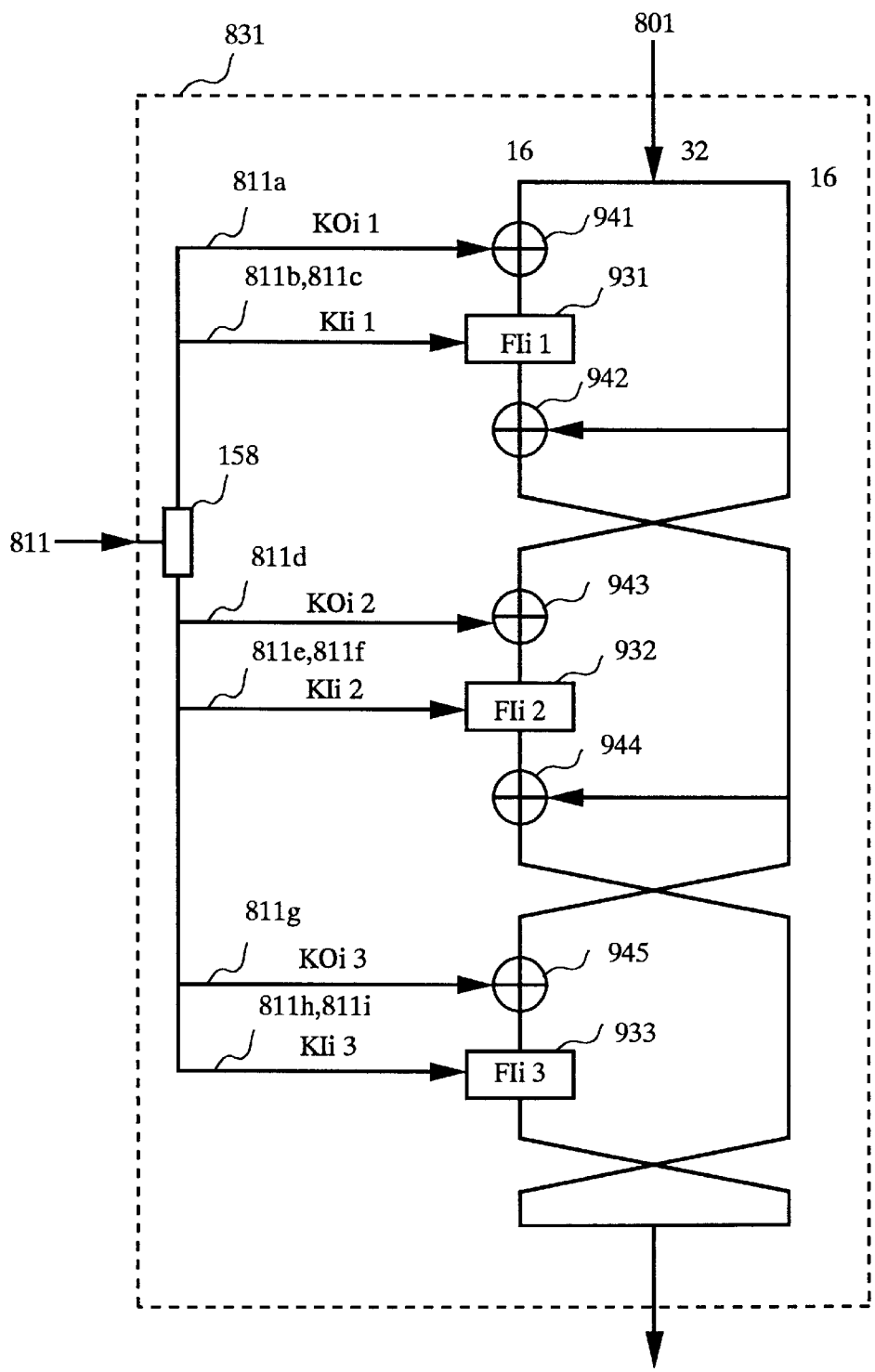
FIG. 18 shows a configuration of an external nonlinear transformer of a data transformation apparatus of Embodiment 9.

FIG. 18 is a block diagram showing a configuration of an external nonlinear transformer 831 (and 832–838) shown in FIG. 17.

Figure 19:
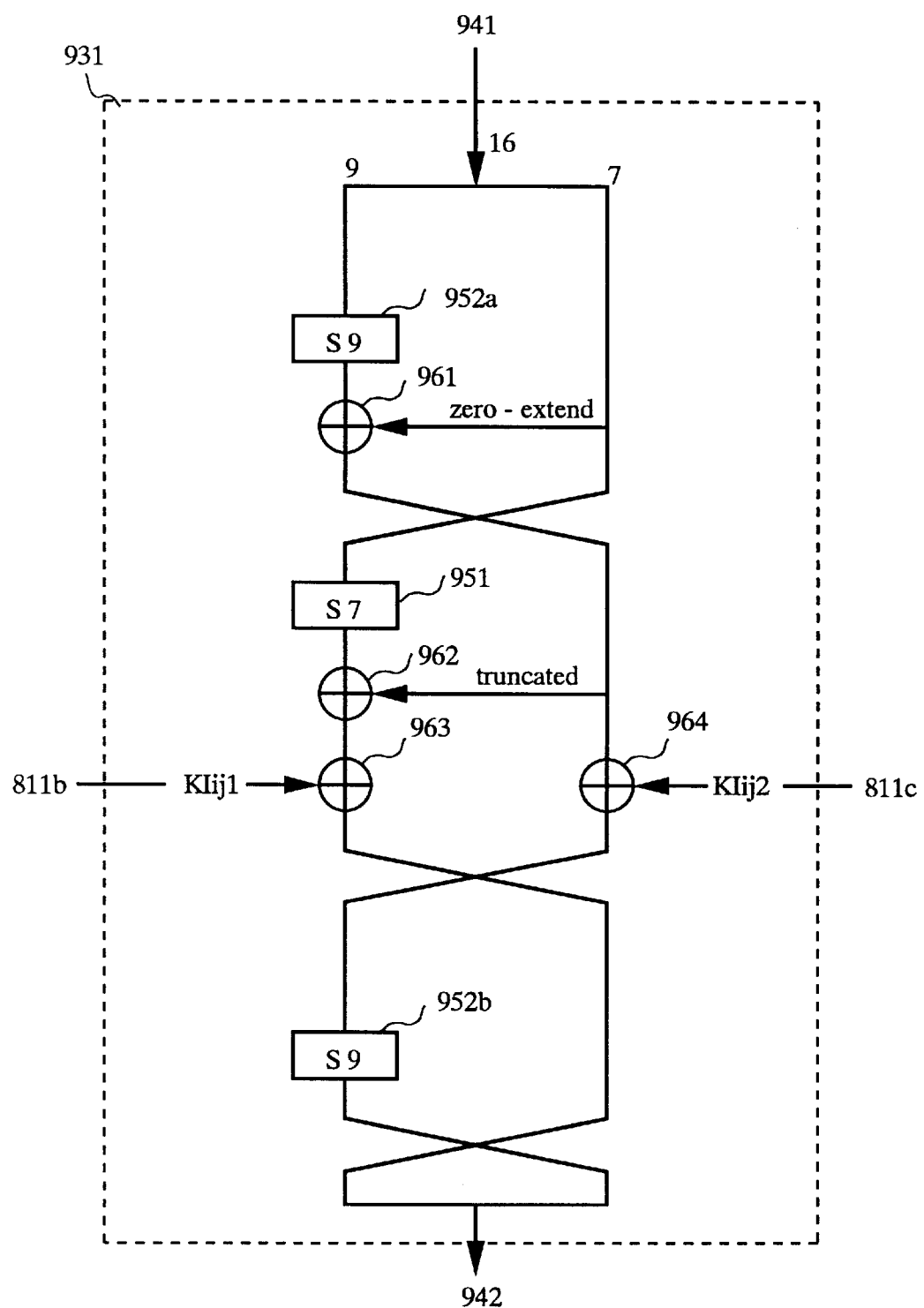
FIG. 19 shows a configuration of an internal nonlinear transformer of an internal nonlinear transformer of a data transformation apparatus of Embodiment 9.

FIG. 19 is a block diagram showing a configuration of an internal nonlinear transformer 931 (and 932, 933) shown in FIG. 18.

In this embodiment, it is assumed that the key parameter 811 has 32×3=96 bits, the length of the key parameter 811a+the key parameter 811b+the key parameter 811c is 32 bits, the length of the key parameter 811d+the key parameter 811e+the key parameter 811f is 32 bits, and the length of the key parameter 811g+the key parameter 811h+the key parameter 811i is 32 bits. The key parameter 811a has 16 bits, the key parameter 811b has 7 bits, and the key parameter 811c has 9 bits.

Figure 20:
FIG. 20 shows an example of nonlinear elements (substitution table) of the internal nonlinear transformer of the data transformation apparatus of the ninth embodiment.
Figure 21:
FIG. 21 shows an example of nonlinear elements (substitution table) of the internal nonlinear transformer of the data transformation apparatus of the ninth embodiment.

FIGS. 20 and 21 are substitution tables S7 and S9 in case that the nonlinear transformers 951, 952a, and 952b shown in FIG. 19 are realized by a ROM (Read Only Memory) or a RAM (Random Access Memory). For example, in the substitution table S7, when data X=0 is input, data Y=85 is output. When data X=1 is input, data Y=95 is output. Further, when X=128 is input, Y=42 is output. In case of the substitution table S9, the operation is the same as S7. When data X=0, 1, . . . , 511 is input, Y=341, 310, . . . , 170 is output.

The above substitution table S7 is configured as described below.

When the root is assumed to be "α" for seven-degree irreducible polynomial $$x^7+x^5+x^4+x^3+1=0,$$

and input basis is assumed to be a normal basis $$\{\alpha, \alpha^2, \alpha^4, \alpha^{16}, \alpha^{32}, \alpha^{64}\}$$

and output basis is assumed to be a normal basis $$\{\alpha^{32}, \alpha^4, \alpha^2, \alpha^{64}, \alpha^{16}, \alpha, \alpha^8\}.$$

$X^{17}$ is expressed by "input X", which is the element of GF (Galois Field) ($2^7$), according to the above basis. $X^{17}$ is XORed (exclusive ORed) with 55 h (hexadecimal number) and output. The above input and output are shown in the table of FIG. 20 by decimal number. In this table, the left side of the input/output data shows LSB (least significant bit).

Also, the above substitution table S9 is configured by the following.

When the root is assumed to be "α" for nine-degree irreducible polynomial $$x^9+x^8+x^7+x^6+x^4+x^3+1=0,$$

and input basis is assumed to be a normal basis $$\{\alpha, \alpha^2, \alpha^4, \alpha^8, \alpha^{16}, \alpha^{32}, \alpha^{64}, \alpha^{128}, \alpha^{256}\}$$

and output basis is assumed to be a normal basis $$\{\alpha^{64}, \alpha, \alpha^{16}, \alpha^8, \alpha^{256}, \alpha^2, \alpha^{128}, \alpha^{32}, \alpha^4\}.$$

$X^5$ is expressed by "input X", which is the element of GF (Galois Field) ($2^9$), according to the above basis. $X^5$ is XORed (exclusive ORed) with 155 h (hexadecimal number) and output. The above input and output are shown in the table of FIG. 21 by decimal number. In this table, the left side of the input/output data shows LSB (least significant bit).

The Galois Field is represented by vector using polynomial basis, or normal basis.

Typically, vector is represented using polynomial basis. For example, when a primitive element of GF($2^m$) is assumed to be "α", an arbitrary element of GF($2^m$) is represented by vector using polynomial basis $\{1, \alpha, \alpha^2, \ldots, \alpha^{m-1}\}$.

It is an advantage of the polynomial basis that addition of elements on GF($2^m$) is performed by addition (XOR operation) by each bit. Namely, when this operation is performed by hardware, "m" number of XOR circuits of 2 inputs can be applied. In case of representation by vector using polynomial basis, however, it is difficult to perform multiplication by hardware compared with addition. It is generally implemented by a ROM to perform multiplication.

For another typical basis, normal basis is used for representing vector. The normal basis is a set consisting of a root "α" of m-degree primitive polynomial and its conjugate elements, and is described as $$\{\alpha, \alpha^2, \alpha^4, \ldots \alpha^{2^{n-2}}, \alpha^{2^{n-1}}\}.$$

Figure 22:
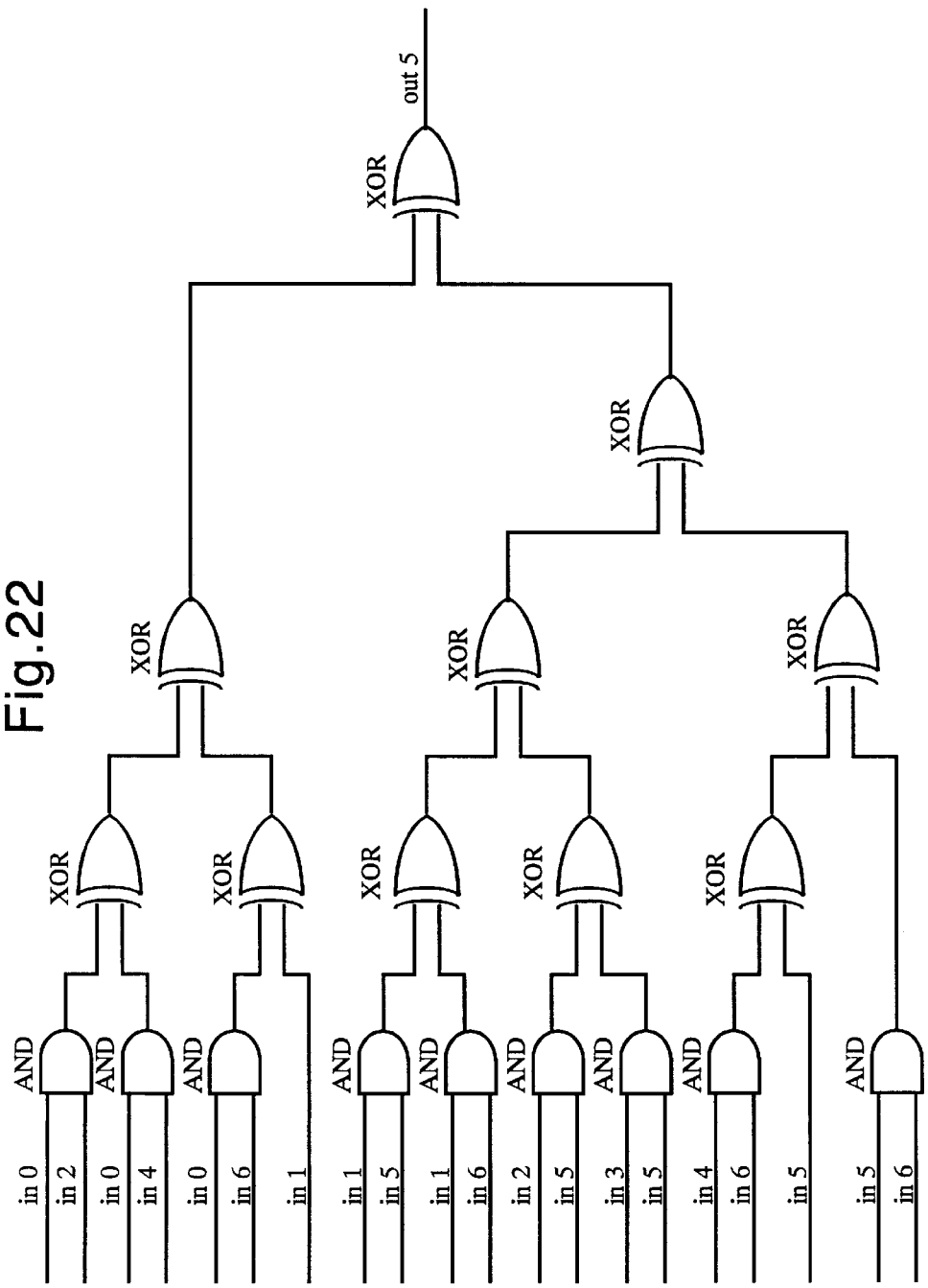
FIG. 22 shows an example of nonlinear elements of the internal nonlinear transformer of FIG. 19 formed by a normal basis of $X^n$ circuit on the Galois Field.

It is very easy to perform a square operation using a normal basis, which is the most advantageous point of using a normal basis. When an arbitrary element of GF($2^m$) is squared, it is performed by shifting the vector representation of the arbitrary element to the right cyclically. In case of the above square operation being performed by hardware, it is realized only by reconnecting the lines of the bits. The above advantage of representing vector by normal basis enables to perform $X^n$ circuit for an arbitrary element X by smaller scale of hardware than a case of representing vector by Polynomial basis. An inverse element ($X^{-1}$) circuit can be also assumed to be $X^n$ circuit. Namely, an inverse element $X^{-1}$ of an arbitrary element X on GF($2^m$) equals $X^{2^n-2}$, and it can be processed in $X^n$ circuit by treating as n=$2^m$−2. For an example of the above hardware, the case of the 6th less significant bit (out 5) is shown in FIG. 22 when it is implemented by a logical circuit assuming that 7 input bits of the above substitution table S7 are {in 0, in 1, in 2, in 3, in 4, in 5, in 6} and that 7 output bits are {out 0, out 1, out 2, out 3, out 4, out 5, out 6}.

The operation of the data transformation apparatus configured as shown in FIGS. 17–19 can be clearly understood by the description of the former embodiments, therefore, the operation is not explained here in detail.

Embodiment 10

In the present embodiment, a data transformation apparatus will be explained, a circuit scale of which is a little increased and which generates stronger cipher.

Figure 23:
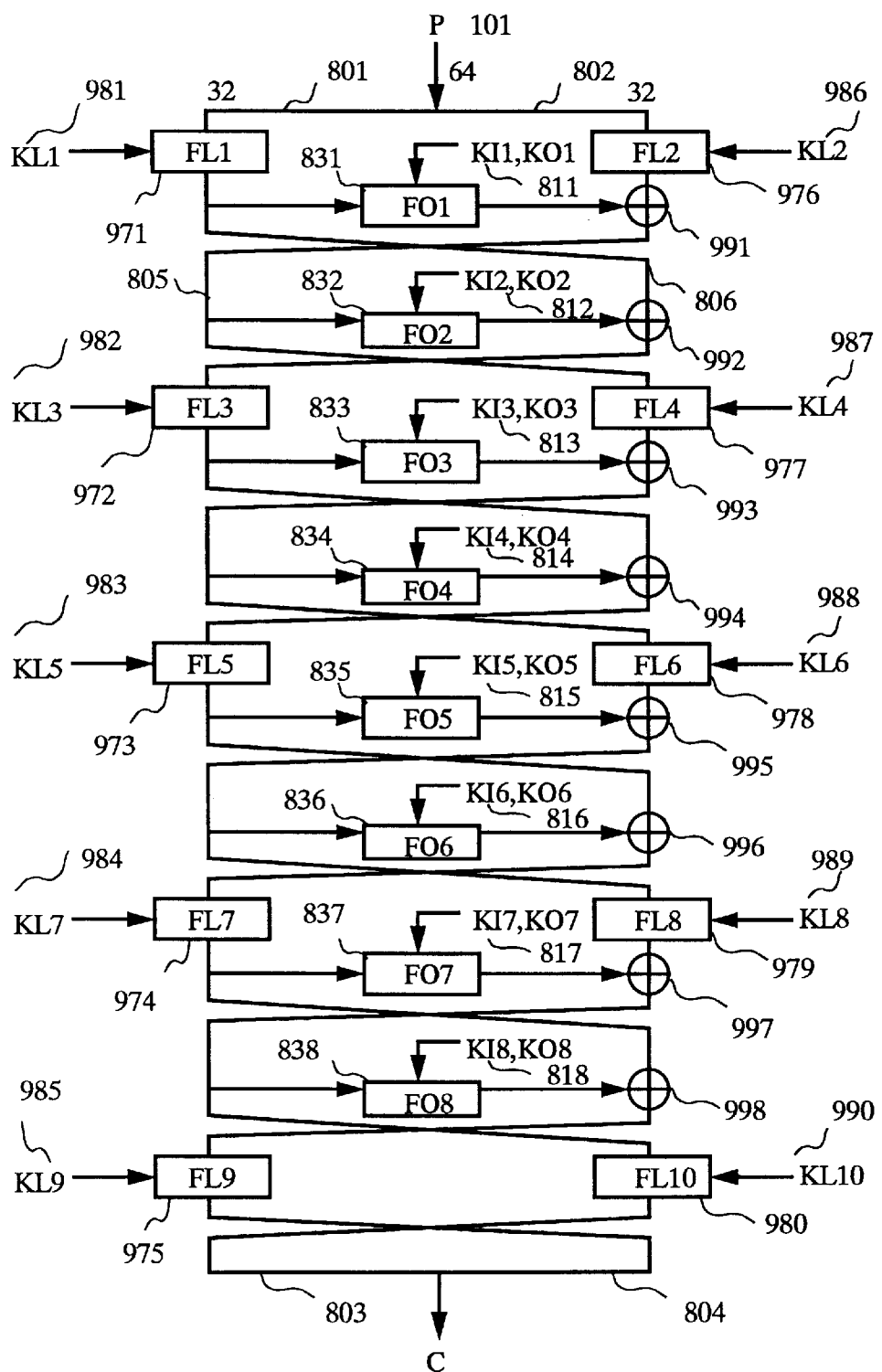
FIG. 23 is a block diagram showing a configuration of a data transformation apparatus of Embodiment 10.

FIG. 23 shows a configuration of the data transformation apparatus of the present embodiment.

The apparatus of the embodiment further includes data transformers FL1–FL10 in the data transformation apparatus of Embodiment 9.

Figure 24:
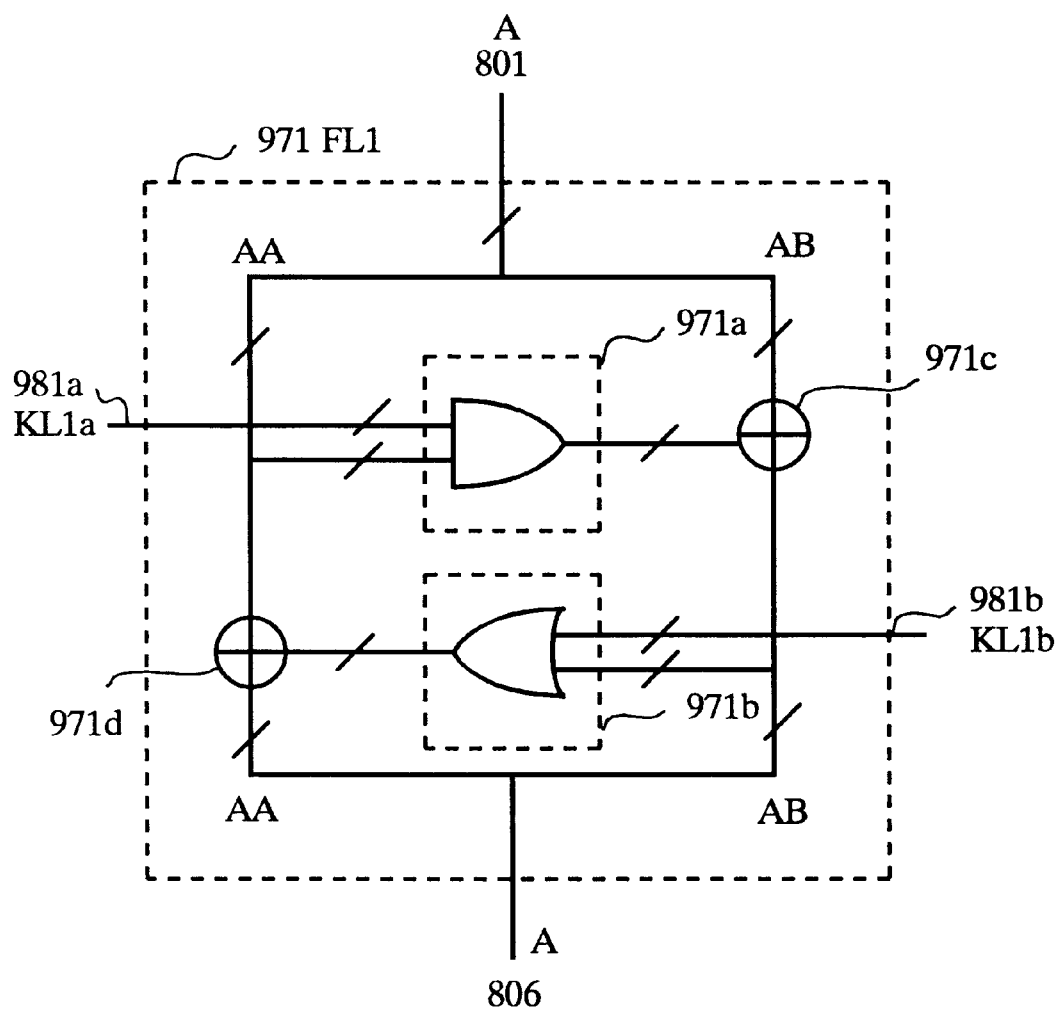
FIG. 24 shows a detailed configuration of the data transformer of FIG. 23.

FIG. 24 shows a detailed configuration of the data transformer FL1 971 (–FL10 980).

Each of data transformers FL1–FL10 includes an AND circuit 971a, an OR circuit 971b and XOR circuits 971c, 971d. A key parameter KL1 has 32 bits, which is divided into key parameters KL1a and KL1b by a key parameter supply unit (this is not illustrated). For example, the key parameter KL1 is divided into the key parameter KL1a of 16 bits and the key parameter KL1b of 16 bits. In the figure, each of the AND circuit 971a and the OR circuit 971b can be either of AND circuit or OR circuit. Both can be OR circuits.

The following is an operation of the above data transformation apparatus.

The data transformer 971 includes two XOR circuits 971c, 971d and the first and the second logical circuits, both of which are two AND circuits, two OR circuits, or AND and OR circuits. The data transformer 971 is provided to either or both of the A input side or/and B input side of the first sub-transformation unit.

A input data (or B input data) is divided by an arbitrary number of digits into two pieces of data, AA data and AB data. The key parameter is divided into A transformation key parameter 981a and B transformation key parameter 981b, each of which corresponds to the divided piece of data. A first AND/OR operation of the AA data and A transformation key parameter 981a is performed in the first logical circuit. The XOR circuit 971c XORs the first ANDed/ORed result with the AB data to output the first XORed result. This first XORed result is output as output data after transformation of the AB data. The second logical circuit performs AND/OR operation of the first XORed result and B transformation key parameter to output the second ANDed/ORed result. The XOR circuit 971d XORs the second ANDed/ORed result and the AA data to output the second XORed result. This second XORed result is output as output data after transformation of AA data. The above output data after transformation of AA data and the output data after transformation of AB data are united to output to the next stage as A output data (or B output data).

The newly provided data transformers FL1–FL10 are linear functions, output of which varies according to the value of the key parameter. These transformers do not increase differential probability and enable the data transformation apparatus to improve its resistance against other cryptanalysises excepting differential cryptanalysis. The operation of the nonlinear transformation has already explained in the former embodiments, and will not be described here.

The data transformers FL1–FL10 do not always need to be configured as shown in FIG. 23. For example, the data transformers FL1, FL3, FL5, FL7, FL9 can be inserted in one side of A sequence (left side in the figure) and B sequence (right side in the figure). In another way, the data transformers can be provided in either of the first and the second sub-transformation units of the pair in one side or both sides of A sequence or/and B sequence.

Embodiment 11

Figure 25:
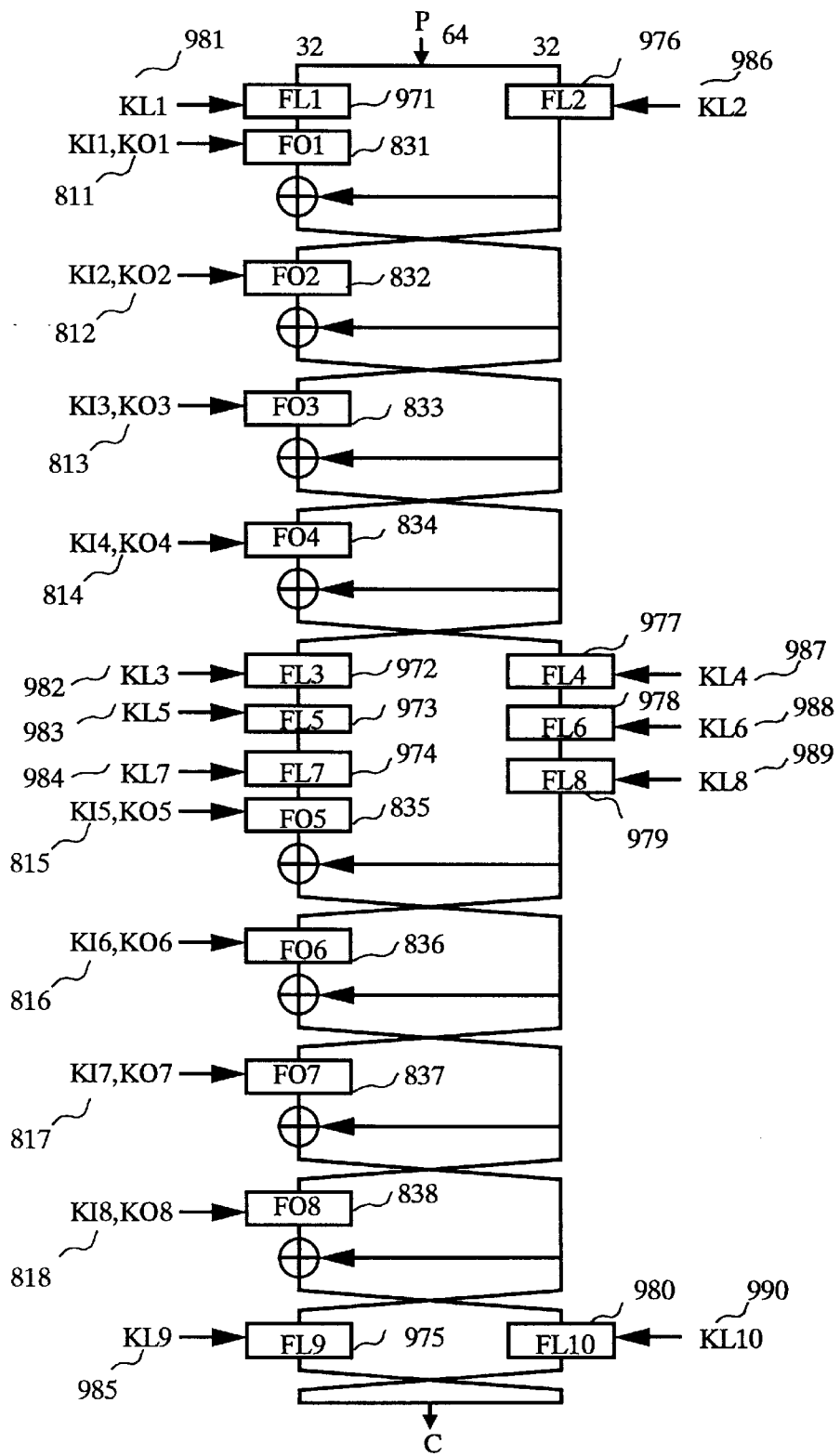
FIG. 25 is a block diagram showing another data transformation apparatus of Embodiment 11.

In embodiments 9 and 10, the nonlinear transformers, being a basic element of the data transformation apparatus of the present invention, are nested in the nonlinear transformer of the conventional sub-transformation unit. In the present embodiment, nonlinear transformers, being a basic element of the data transformation apparatus of the invention, are nested in the nonlinear transformer of the sub-transformation unit, being a basic element of the data transformation apparatus of the present invention. As shown in FIG. 25, the present embodiment is a modified data transformation apparatus of Embodiment 10, some elements of which are differently arranged in the apparatus. As the operation of the data transformation apparatus has been explained in the former embodiments, it is not described here in detail. Each location of the data transformer FL1–FL10 does not always need to be placed as shown in the figure as well as Embodiment 10. Even with such a different location, the apparatus can work effectively as well.

FIG. 26 is a table showing each characteristics of Embodiments 1–11.

In rows, Embodiments 1, 2, 4, and 5 are respectively shown, and in columns, Embodiments 3, 6, 7, 8, 9, 10, and 11, are shown for combining with each of the above Embodiments 1, 2, 4, and 5. The rows for Embodiments 1 and 2 respectively show characteristics of their sub-transformation units. In FIG. 26, the sub-transformation unit of Embodiment 1, configured as shown in FIG. 1, is called type 1. The sub-transformation unit of Embodiment 2, configured as shown in FIG. 3, is called type 2. Embodiment 3 has a nest configuration of the external sub-transformation unit and the internal sub-transformation unit. The sub-transformation units of FIGS. 1 and 3, without having nest configurations, are defined as the external sub-transformation units in FIG. 26. In FIG. 26, number of figure parenthesized by () indicates which figure the configuration is shown in. For example, (FIG. 1) indicates the sub-transformation unit type 1 is shown in FIG. 1. (FIG. 6) indicates Embodiment 3 is shown in FIG. 6, which includes the external sub-transformation unit of type 1 and the internal sub-transformation unit of type 1. Plural elements parenthesized by {} indicates either one of the plural elements can be chosen optionally. In Embodiment 3, for example, either of the sub-transformation units of type 1 and type 2 is applicable to the internal sub-transformation unit. It can be clearly understood by the figure that any characteristics of Embodiments 1, 2, 4, and 5 can be combined with any characteristics of Embodiments 3, 6, 7, 8, 9, 10 and 11. The data transformation apparatus of the present invention can be configured not only by combination of characteristics shown in FIG. 26, but can be also configured by combination of these characteristics with other characteristics, which are not shown in FIG. 26. The data transformation apparatus can be configured not only by combination of characteristics, but also configured by each characteristic of each Embodiment.

The following shows application examples of the data transformation apparatus according to the present invention.

FIG. 27 illustrates a personal computer or a work station, where the data transformation apparatus of the invention is applied.

The data transformation apparatus 60 includes a display unit 61, a keyboard 62, a mouse 63, a mouse-pad 64, a system unit 65, and a compact disk drive 100.

In the data transformation apparatus of the invention, for example, data is input from the compact disk drive 100, data is transmitted to the system unit 65, and is displayed on the display unit 61 as shown in FIG. 27. On the other hand, the data transformation apparatus outputs the data displayed on the display unit 61 to the compact disk drive 100. The data transformation apparatus also transforms data and transmits the information via lines (not illustrated). However, the application of the data transformation apparatus of the invention is not limited to the personal computer or the work station shown in FIG. 27. The data transformation apparatus can be configured in various ways, for example, a video player can be included instead of the compact disk drive 100 as an inputting device. For another example, data can be input from the network. Data can be received either in analog or in digital.

In FIG. 27, the data transformation apparatus of the invention is shown as an independent existence. The data transformation apparatus can be implemented inside of the units such as a printer 66, a scanner 68, or a facsimile unit 69 as shown in FIG. 28. For another example, the data transformation apparatus of the invention can be implemented as a part of a system board of a television camera, a measuring machine, the computer, etc. For a further application example, each of the equipments shown in FIG. 28 is connected via LAN (Local Area Network) to mutually transmit the encoded information, which is not illustrated in FIG. 28. The encoded information can be transmitted/received via WAN (Wide Area Network) such as ISDN.

Industrial Applicability

As has been described, in the data transformation apparatus according to the present invention, the sub-transformation unit is configured to partially process input data in parallel, which enables the apparatus to have small differential probability and to perform a high speed data transformation. The data transformation apparatus can be effectively applied to an encryptor for the information processing apparatus or the data communication.

Further, in the data transformation apparatus of the invention, feedback loop is provided for repeating the operation of the same elements in the circuit. Therefore, the apparatus can be applicable to an encryptor with a reduced circuit scale and with high speed performance.

What is claimed is:

1. A data transformation apparatus for transforming two arbitrary pieces of data of A input data and B input data comprising:

a configuration for performing a first nonlinear transformation of the A input data using a first key parameter, outputting a transformed result, performing an XOR operation of the transformed result and B input data to output an XORed result as B intermediate data, and outputting B input data as A intermediate data without any transformation, a configuration for operating a second nonlinear transformation of the A intermediate data using a second key parameter, outputting a transformed result, performing an XOR operation of the transformed result and the B intermediate data to output an XORed result as next B intermediate data, and outputting the B intermediate data as A intermediate data without any transformation, and wherein the above two configurations are connected in a cascade to output A intermediate data and B intermediate data as output data after transformation.

2. The data transformation apparatus of claim 1, comprising either one of:

a configuration of a first sub-transformation unit and a second sub-transformation unit,
wherein the first sub-transformation unit includes a first nonlinear transformer and an XOR circuit located between an input side of the first nonlinear transformation and an input side of the second nonlinear transformation,
wherein the second sub-transformation unit includes a second nonlinear transformer and an XOR circuit located between an input side of the second nonlinear transformation and an input side of a next first nonlinear transformation; or a configuration of a first sub-transformation unit and a second sub-transformation unit,
wherein the first sub-transformation unit includes the XOR circuit and the second nonlinear transformer located between an output side of the first nonlinear transformation and an output side of the second nonlinear transformation, and
wherein the second sub-transformation unit includes the XOR circuit and a first nonlinear transformer located between an output side of the second nonlinear transformation and an output side of the next first nonlinear transformation;

wherein the first sub-transformation unit and the second sub-transformation unit are alternately connected necessary number of times from a first stage to a last stage, and wherein the sub-transformation unit of the last stage, being either of the first sub-transformation unit and the second sub-transformation unit, outputs A intermediate data and B intermediate data as output data after transformation.

3. The data transformation apparatus of claim 2,
wherein on the first or the second nonlinear transformation, A input data, input to the sub-transformation unit is divided by an arbitrary number of digits into A1 input data for inputting to A1 input side and A2 input data for inputting to A2 input side, and the key parameter is divided by an arbitrary number of digits into a first to an n-th divided key parameters; and
the data transformation apparatus further including,
a first internal sub-transformation unit for performing an internal nonlinear transformation of A1 input data, being a division of the A input data, using a first divided key parameter, outputting a transformed result, performing an XOR operation of the transformed result and the A2 input data, outputting an XORed result as a first A2 internal intermediate data, and outputting the A2 input data as a first A1 internal intermediate data without any transformation, and
a second internal sub-transformation unit for performing an internal nonlinear transformation of the A1 intermediate data as A1 input data using the second divided key parameter, outputting a transformed result, operating an XOR of the transformed result and the first A2 internal intermediate data as A2 input data, outputting an XORed result as a second A2 internal intermediate data, and outputting the first A2 internal intermediate data as a second A1 internal intermediate data without any transformation;

wherein the first internal sub-transformation unit and the second internal sub-transformation unit are alternately connected "n" times from a first stage to a last stage, and
wherein A1 internal intermediate data and A2 internal intermediate data are output from the last stage as a transformation result.

4. The data transformation apparatus of claim 2,
wherein on the nonlinear transformation of each sub-transformation unit, A input data, input to the sub-transformation unit, is divided by an arbitrary number of digits into A1 input data and A2 input data, and the key parameter is divided by an arbitrary number of digits into a first to an n-th divided key parameters; and
the data transformation apparatus further including,
a first internal sub-transformation unit for performing an internal nonlinear transformation of A1 input data, being a division of the A input data, using a first divided key parameter, outputting a transformed result as a first A2 internal intermediate data, operating an XOR of the A1 input data and the A2 input data, and outputting an XORed result as a first A1 internal intermediate data, and
a second internal sub-transformation unit for performing an internal nonlinear transformation of the first A1 internal intermediate data, output from the first internal sub-transformation unit as A1 input data, using the second divided key parameter, outputting a transformed result as a second A2 internal intermediate data, operating an XOR of the first A1 internal intermediate data and the first A2 internal intermediate data as the A1 input data and the A2 input data, and outputting an XORed result as a second A1 internal intermediate data;

wherein the first internal sub-transformation unit and the second internal sub-transformation unit are alternately connected "n" times from a first stage to a last stage, and
wherein A1 internal intermediate data and A2 internal intermediate data output from the last stage are united as a transformation result.

5. A data transformation apparatus for transforming two arbitrary pieces of data of A input data and B input data comprising,
a sub-transformation unit for performing a nonlinear transformation of the B input data using a first key parameter, outputting a transformed result, operating an XOR of the transformed result and the A input data to output an XORed result as B intermediate data, and outputting the B input data as A intermediate data without any transformation;
wherein the sub-transformation units, for inputting the A intermediate data and the B intermediate data as A input data and B input data to be transformed by each key parameter, are connected necessary times from a first stage to a last stage;
wherein A intermediate data and B intermediate data are output from the last stage as a transformation result;
wherein on a nonlinear transformation in each sub-transformation unit, the sub-transformation unit includes a plurality of internal sub-transformation units, B input data input to the internal sub-transformation unit is divided by an arbitrary number of digits into B1 input data and B2 input data, and the key parameter is divided by an arbitrary number of digits into a first divided key parameter to an n-th divided key parameter;

wherein the sub-transformation unit including,
  a first internal sub-transformation unit for performing a first internal nonlinear transformation of the B1 input data, being a division of the B input data, using the first divided key parameter outputting a transformed result, operating on XOR of the transformed result and the B2 input data to output an XORed result as a first B2 internal intermediate data, and outputting the B2 input data as a first B1 internal intermediate data;
  a second internal sub-transformation unit for performing an internal nonlinear transformation of the first B1 internal intermediate data, output from the first internal sub-transformation unit as B1 input data, using the second divided key parameter outputting a transformed result, operating an XOR of the transformed result and the first B2 internal intermediate data as B2 input data to output an XORed result as the second B2 internal intermediate data, and outputting the first B2 internal intermediate data as a second B1 internal intermediate data without any transformation;
  wherein the first internal sub-transformation unit and the second internal sub-transformation unit are alternately connected n times from a first stage to a last stage; and
  wherein the B1 internal intermediate data and the B2 internal intermediate data are output from the last stage as a transformation result.

6. The data transformation apparatus of claim 5,
  wherein each internal sub-transformation unit performs an internal nonlinear transformation of the B1 input data to output a transformed result as the B2 internal intermediate data, operating an XOR of the B2 input data and the B1 input data to output an XORed result as the B1 internal intermediate data so that an XOR operation is performed at a different location.

7. The data transformation apparatus of claim 5 or 6 for transforming four arbitrary pieces of data of A1 input data, A2 input data, B1 input data, and B2 input data,
  wherein on each sub-transformation, a nonlinear transformation and an XOR are performed between A1 input data and B1 input data and between A2 input data and B2 input data to respectively output B1 intermediate data and B2 intermediate data, and the B1 input data and the B2 input data are output as A1 intermediate data and A2 intermediate data without any transformation.

8. The data transformation apparatus of claim 1 or 5, wherein A input data and B input data, A intermediate data and B intermediate data are respectively divided into pieces of data so that each of the divided data has equal number of digits in both A and B.

9. A data transformation method for transforming two arbitrary pieces of data of A input data and B input data, the method comprising:
  outputting the B input data as a first A intermediate data without any transformation;
  performing a nonlinear transformation of the A input data using a first key parameter, outputting a transformed result, operating an XOR of the transformed result and the B input data to output an XORed result as a first B intermediate data;
  inputting the first B intermediate data to output as a second A intermediate data without any transformation;
  performing a nonlinear transformation of the first A intermediate data using a second key parameter to the first A intermediate data, outputting a transformed result, operating an XOR of the transformed result and the first B intermediate data to output an XORed result as a second B intermediate data; and
  outputting A intermediate data and B intermediate data as a transformation result.

10. A data transformation method for transforming two arbitrary pieces of data of A input data and B input data, the method comprising:
  operating an XOR of the A input data and the B input data to output an XORed result as a first A intermediate data;
  performing a nonlinear transformation of the A input data using a first key parameter to output a transformed result as a first B intermediate data;
  operating an XOR of the first A intermediate data and the first B intermediate data to output an XORed result as a second A intermediate data;
  performing a nonlinear transformation of the first A intermediate data using a second key parameter to output a transformed result as a second B intermediate data;
  outputting A intermediate data and B intermediate data as a transformation result.

11. The data transformation apparatus of claim 1, comprising either one of:
  a configuration of a first sub-transformation unit and a second sub-transformation unit:
    wherein the first sub-transformation unit includes a first nonlinear transformer and an XOR circuit located between an input side of the first nonlinear transformation and an input side of the second nonlinear transformation; and
    wherein the second sub-transformation unit includes a second nonlinear transformer and an XOR circuit located between an input side of the second nonlinear transformation and a next first nonlinear transformation, and
  a configuration of a first sub-transformation unit and a second sub-transformation unit:
    wherein the first sub-transformation unit includes the XOR circuit and the second nonlinear transformer located between an output side of the first nonlinear transformation and an output side of the second nonlinear transformation; and
    wherein the second sub-transformation unit includes the XOR circuit and a first nonlinear transformer located between an output side of the second nonlinear transformation and an output side of a next first nonlinear transformation; and
  wherein the first sub-transformation unit and the second sub-transformation unit are alternately connected necessary number of times from a first stage to a last stage,
  the data transformation apparatus further comprising:
    a data selecting unit provided to an input side of the first sub-transformation unit,
    a data holding unit provided to an output side of last stage of either of the first and second sub-transformation units, and
    a key parameter supply unit;
  wherein, at first, the data selecting unit selects and inputs two arbitrary pieces of data of A input data and B input data, and after selecting and inputting the A input data and the B input data, the data selecting unit is set to select and input output data from the data holding unit so as to form a feedback loop;
  wherein the data transformation apparatus iteratively repeats transformation of data, the key parameter supply unit supplies key parameter to each sub-transformation unit corresponding to the iteratively repeated transformation of data, and the data holding unit outputs A intermediate data and B intermediate data as a transformation result.

12. The data transformation apparatus of claim 1 for transforming two arbitrary pieces of data of A input data and B input data, both of which having a same number of digits, comprising either one of:

a sub-transformation unit including a first nonlinear transformer and an XOR circuit located between the input side of the first nonlinear transformation and the input side of the second nonlinear transformation; and a sub-transformation unit including an XOR circuit and a second nonlinear transformer located between the output side of the first nonlinear transformation and the output side of the second nonlinear transformation;

wherein the sub-transformation units are connected, the data transformation apparatus further comprising:
a data selecting unit provided to the input side of a first sub-transformation unit,
a data holding unit provided to the output side of a last sub-transformation unit, and
a key parameter supply unit;

wherein the data selecting unit selects and inputs the A input data and the B input data, after selecting and inputting A input data and B input data, the data selecting unit is set to select and input output data from the data holding unit so as to form a feedback loop; and wherein the data transformation apparatus iteratively repeats transformation of data, the key parameter supply unit supplies key parameter to each sub-transformation unit corresponding to the iteratively repeated transformation of data, and the data holding unit outputs A intermediate data and B intermediate data as a transformation result.

13. The data transformation apparatus of claim 2:

wherein A input data is divided by an arbitrary number of digits into A1 input data and A2 input data, and the key parameter is divided by an arbitrary number of digits into a first to an n-th divided key parameter;

wherein the sub-transformation unit further includes,
a first internal sub-transformation unit for performing an internal nonlinear transformation of the A1 input data, a division of the A input data, using the divided key parameter, outputting a transformed result, operating an XOR of the transformed result and the A2 input data to output an XOR result as a first A2 internal intermediate data, and outputting the A2 input data as a first A1 internal intermediate data without any transformation, and
a second internal sub-transformation unit for inputting the first A1 internal intermediate data output from the first internal sub-transformation unit as A1 input data, performing an internal nonlinear transformation of the first A1 internal intermediate data using the second divided key parameter, outputting a transformed result, operating an XOR of the transformed result and the first A2 internal intermediate data as A2 input data to output an XORed as a second A2 internal intermediate data, and outputting the first A2 internal intermediate data as a second A1 internal intermediate data without any transformation;

wherein the first internal sub-transformation unit and the second internal sub-transformation unit are alternately connected "n" times from a first stage to a last stage, wherein the sub-transformation unit further includes:
an internal data selecting unit provided to the input side of the first internal sub-transformation unit,
an internal data holding unit provided to the output side of either of the first and the second internal sub-transformation units, and
an internal key parameter supply unit;

wherein, at first, the internal data selecting unit selects and inputs the A1 input data and the A2 input data, after selecting and inputting A1 input data and A2 input data, the internal data selecting unit is set to select and input output data from the internal data holding unit so as to form a feedback loop; and wherein the sub-transformation unit repeats internal transformation of data necessary number of times, the internal key parameter supply unit supplies the divided key parameter to each internal sub-transformation unit corresponding to repeated transformation, and at last, the internal data holding unit outputs A1 intermediate data and A2 intermediate data as A output data after transformation.

14. A data transformation apparatus of claim 2:

wherein A input data is divided by an arbitrary number of digits into A1 input data and A2 input data, and the key parameter is divided by an arbitrary number of digits into a first to an n-th divided key parameters;

wherein the sub-transformation unit further includes:
a first internal sub-transformation unit for inputting A1 input data, a division of the A input data, performing an internal nonlinear transformation of the A1 input data using the first divided key parameter, outputting a transformed result as a first A2 internal intermediate data, operating an XOR of the A1 input data and A2 input data to output an XORed as a first A1 internal intermediate data; and
a second internal sub-transformation unit for inputting the first A1 internal intermediate data output from the first internal sub-transformation unit as A1 input data, performing an internal nonlinear transformation of the first A1 internal intermediate data using the second divided key parameter, outputting a transformed result as a second A2 internal intermediate data, operating an XOR of the first A1 internal intermediate data and the first A2 internal intermediate data as A1 input data and A2 input data, and outputting an XORed result as a second A1 internal intermediate data;

wherein the first internal sub-transformation unit and the second internal sub-transformation unit are alternately connected n times from a first stage to a last stage, wherein the sub-transformation unit further includes:
an internal data selecting unit provided to the input side of the first internal sub-transformation unit,
an internal data holding unit provided to the output side of either of the first and the second internal sub-transformation units, and
an internal key parameter supply unit;

wherein, at first, the internal data selecting unit selects and inputs the A1 input data and the A2 input data, after selecting the inputting A1 input data and A2 input data, the internal data selecting unit is set to select and input output data from the data holding unit so as to form a feedback loop;

wherein the sub-transformation unit repeats internal transformation of data necessary number of times, the internal key parameter supply unit supplies the divided key parameter to each sub-transformation unit corresponding to repeated transformation, and at last, the internal data holding unit outputs A1 intermediate data and A2 intermediate data as A output data after transformation.

15. The data transformation apparatus of claim 13 or 14, wherein A input data, to be input to the nonlinear transformation of each sub-transformation unit, is divided into two pieces of data, both of which having identical number of digits; and wherein a necessary number of the first internal sub-transformation units are connected.

16. The data transformation apparatus of claim 5 or 6, wherein the first internal sub-transformation unit and the second internal sub-transformation unit are alternately connected necessary number of times from a first stage to a last stage, wherein the sub-transformation unit further includes:
an internal data selecting unit provided to the input side of the first stage of the first internal sub-transformation unit;
an internal data holding unit provided to the output side of either of the first and the second internal sub-transformation units; and
an internal key parameter supply unit;
wherein, at first, the internal data selecting unit selects and inputs the B1 input data and the B2 input data, after selecting and inputting B1 input data and B2 input data, the internal data selecting unit is set to select and input output data from the internal data holding unit so as to form a feedback loop,
wherein the sub-transformation unit repeats internal transformation of data necessary number of times, the internal key parameter supply unit supplies the divided key parameter to each internal sub-transformation unit corresponding to repeated transformation, and at last, the internal data holding unit outputs B1 intermediate data and B2 intermediate data are united as B intermediate data after transformation.

17. The data transformation apparatus of claim 16, wherein B input data, to be input to the internal nonlinear transformation of each sub-transformation unit, is divided into two pieces of data having identical number of digits; and wherein a necessary number of times of the first sub-transformation unit are connected.

18. The data transformation apparatus of claim 5 or 6, comprising an even number of sub-transformation units for transforming data using each key parameter, the data transformation apparatus further comprising:
a data selecting unit provided to the input side of the first sub-transformation unit;
a data selecting unit provided to the output side of the last sub-transformation unit, and
a key parameter supply unit;
wherein, at first, the data selecting unit selects and inputs two arbitrary pieces of data of A input data and B input data, after selecting and inputting two pieces of data, the data selecting unit is set to select and input output data from the data holding unit so as to form a feedback loop,
wherein the data transformation apparatus repeats transformation of data necessary number of times, the key parameter supply unit supplies key parameter to each sub-transformation unit corresponding to repeated transformation, and at least, the data holding unit outputs A intermediate data and B intermediate data as a transformation result.

19. The data transformation apparatus of claim 1 or 5, wherein at least one of the nonlinear transformers is $X^n$ circuit on Galois Field.

20. The data transformation apparatus of claim 19, wherein the $X^n$ circuit on Galois Field is formed by a normal basis.

21. The data transformation apparatus of claim 1 or 5, wherein at least one part of the nonlinear transformer is a Read Only Memory.

22. The data transformation apparatus of claim 1 or 5, wherein at least one part of the nonlinear transformer is a Random Access Memory.

23. The data transformation apparatus of claim 1 or 5, wherein at least one part of the nonlinear transformation is a Logic Circuit.

24. The data transformation apparatus of claim 2 further comprising:
two logic circuits, being either of two XOR circuits and AND and OR circuits, provided to at least one of A input side and B input side of the first sub-transformation unit as a data transformer,
wherein the input data, input to the data transformer, is divided into two pieces of data having arbitrary number of digits as AA data and AB data, the key parameter is divided into A transformation key parameter and B transformation key parameter;
wherein the AA data is performed a first logical operation using the A transformation key parameter, a first operation result is XORed with the AB data to output a first XOR, and the first XOR is output as output data after transforming AB data;
wherein the first XOR is performed a second logical operation using B transformation key parameter, a second operation result is XORed with the AA data to output a second XOR, the second XOR is output as output data after transforming AA data, and the output data after transforming AA data and the output data after transforming AB data are united and output.

25. A data transformation apparatus for inputting and transforming data of a first and a second sequences (A and B), performing a nonlinear transformation of the data using a key parameter, and outputting a transformed result of the data of the first and the second sequences (A and B), comprising:
a first sub-transformation unit and a second sub-transformation unit, being at least two of sub-transformation units having a nonlinear transformer for performing the nonlinear transformation of data (A) of the first sequence using the key parameter, and an XOR circuit for operating an XOR of data of the first and second sequences (A and B); and
wherein the data of the first and the second sequences (A and B) output from the first sub-transformation unit is input as data of the second and the first sequence (B and A), and nonlinear transformation is performed simultaneously in the nonlinear transformers of the first and the second sub-transformation units.

26. The data transformation apparatus of claim 25, wherein:
the data transformation apparatus inputs A input data and B input data as data of the first and the second sequences and outputs A output data and B output data;
the first sub-transformation unit performs a first nonlinear transformation of the A input data using a first key parameter, outputs a transformed result, operates an XOR of the transformed result and the B input data to output an XORed result as B intermediate data, and outputs the B input data as A intermediate data without any transformation;

the second sub-transformation unit inputs the A intermediate data, performs a second nonlinear transformation of the A intermediate data using a second key parameter, outputs a transformed result, operates an XOR of the transformed result and the B intermediate data to output an XORed result as B intermediate data, and outputs the B intermediate data as A intermediate data without any transformation;

the first sub-transformation unit and the second sub-transformation unit are alternately connected, and A intermediate data and B intermediate data output from the first or the second sub-transformation unit are output as A output data and B output data.

27. The data transformation apparatus of claim 25, wherein:

the data transformation apparatus inputs A input data and B input data as data of the first and the second sequences and outputs A output data and B output data;

the first sub-transformation unit performs a first nonlinear transformation of the A input data using a first key parameter to the A input data, outputs a transformed result as B intermediate data, and operates an XOR the B input data and the A input data to output A intermediate data;

the second sub-transformation unit inputs the A intermediate data and performs a second nonlinear transformation to the A intermediate data, using a second key parameter outputs a transformed result as B intermediate data, operates an XOR of the B intermediate data output from the first sub-transformation unit and the A intermediate data to output an XORed result as A intermediate data;

the first sub-transformation unit and the second sub-transformation unit are alternately connected, and A intermediate data and B intermediate data output from either of the first and the second sub-transformation unit are output as A output data and B output data.

28. The data transformation apparatus of claim 25, comprising:

a basic configuration of the first sub-transformation unit and the second sub-transformation unit connected in a cascade;

a repeating unit for repeating a nonlinear transformation of the basic configuration a predetermined times;

a key parameter supply unit for supplying a first and a second key parameters to the first and the second sub-transformation units to be used as a first and a second key parameters at predetermined times corresponding to the number of repeating;

wherein after repeating, A intermediate data and B intermediate data are output as A output data and B output data.

29. A data transformation apparatus for inputting data of a first and a second sequences (A and B), transforming the data using a key parameter, and outputting a transformed result of the first and the second sequences (A and B) comprising a sub-transformation unit, a repeating unit, and a key parameter supply unit:

wherein the sub-transformation unit inputs data of the first and the second sequences (A and B) and outputs the data of the second sequence as an intermediate first data, includes a nonlinear transformer for performing a nonlinear transformation to the data of the first sequence (A) using a key parameter and outputting a transformed result, and an XOR circuit for inputting the transformed result and the data of the second sequence, and operating an XOR of the transformed result and the data of the second sequence;

wherein the repeating unit repeatedly inputs the intermediate first data and the intermediate second data (A and B) output from the sub-transformation unit and repeatedly outputs as the data of the first and second sequences to the sub-transformation unit for iteratively repeating the operation; and wherein the key parameter supply unit supplies a key parameter to the nonlinear transformer of the sub-transformation unit corresponding to each repeated operation.

30. The data transformation apparatus of claim 25, wherein the nonlinear transformer further comprises:

an internal division unit for dividing the input data of the first sequence (A) by an arbitrary number of digits into a first divided data and a second divided data (A1 and A2);

a key parameter supplying unit for dividing the key parameter by an arbitrary number of digits and for supplying the divided key parameter;

a first internal sub-transformation unit and a second internal sub-transformation unit, being at least two of an internal sub-transformation units wherein the internal sub-transformation unit inputs the first and the second divided data (A1 and A2), includes an internal nonlinear transformer for performing a nonlinear transformation of the first divided data (A1) using the divided key parameter and an internal XOR circuit for operating an XOR of the first and the second divided data (A1 and A2);

wherein the first and the second divided data (A1 and A2) output from the first internal sub-transformation unit is input to the second internal sub-transformation unit as the second and the first divided data (A2 and A1), wherein the internal nonlinear transformers of the first and the second internal sub-transformation units simultaneously perform nonlinear transformation.

31. A data transformation apparatus for inputting data of a first and a second sequence (B and A), performing a nonlinear transformation of the input data using a key parameter, and outputting a transformed result of the first and the second sequences (B and A) comprising a sub-transformation unit;

wherein the sub-transformation unit includes:

a nonlinear transformer for performing the nonlinear transformation of the data of the first sequence (B) using the key parameter;

an XOR circuit for operating an XOR of the data of the first and the second sequences;

wherein the nonlinear transformer includes:

an internal division unit for dividing the input data of the first sequence (B) by an arbitrary number of digits into a first divided data and a second divided data (B1 and B2);

a key parameter supply unit for dividing the key parameter by an arbitrary number of digits into divided key parameters and for supplying the divided key parameters;

at least two internal sub-transformation units as a first internal sub-transformation unit and a second internal sub-transformation unit having an internal nonlinear transformer for inputting the first and the second divided data (B1 and B2), performing a nonlinear transformation of the first divided data (B1) using the divided key parameter and an XOR circuit for operating an XOR of the first divided data and the second divided data;

wherein the first divided data and the second divided data (B1 and B2) output from the first internal sub-transformation unit are input to the second internal sub-transformation unit as the second divided data and the first divided data (B2 and B1);

wherein the internal nonlinear transformers of the first and the second internal sub-transformation units simultaneously perform nonlinear transformations.

32. A data transformation apparatus for transforming input data A and input data B, comprising:

a first transformation unit and a second transformation unit;

said first transformation unit for performing a first nonlinear transformation of the input data A, and outputting the input data B as intermediate data A without any transformation;

said second transformation unit for inputting the intermediate data A, performing a second nonlinear transformation of the intermediate data A, and outputting intermediate data B as intermediate data A without any transformation, wherein said first transformation unit and said second transformation unit are connected in a cascade to output the intermediate data A and the intermediate data B as output data after transformation, and wherein the first and second nonlinear transformations are performed substantially in parallel.

33. A data transformation apparatus for transforming input data A and input data B, comprising:

a first transformation unit including a first XOR circuit and a second transformation unit including a second XOR circuit;

said first transformation unit for performing a first nonlinear transformation of the input data A, and outputting the input data B as intermediate data A without any transformation;

said second transformation unit for inputting the intermediate data A, performing a second nonlinear transformation of the intermediate data A, and outputting intermediate data B as intermediate data A without any transformation;

wherein the first and second XOR circuits are in different locations in said first and second transformation units and the first and second XOR are connected circuits in a cascade-type architecture;

wherein said first transformation unit and said second transformation unit are alternately connected, and the intermediate data A and the intermediate data B are outputted from said first or said second transformation unit as output data A and output data B.

34. A data transformation apparatus for inputting data of first and second sequences, transforming the data using a key parameter, and outputting a transformed result of the first and the second sequences comprising:

a sub-transformation unit inputting data of the first and the second sequences, includes a nonlinear transformer for performing a nonlinear transformation to the data of the first sequence using a key parameter and outputting a transformed result as an intermediate second data, and an XOR circuit for inputting the data of the first sequence and the data of the second sequence, operating an XOR of the data of the first sequence and the data of the second sequence, and outputting a result of the XOR operation as an intermediate first data;

a repeating unit repeatedly inputs the intermediate first data and the intermediate second data output from the sub-transformation unit and repeatedly outputs as the data of the first and second sequences to the sub-transformation unit for iteratively repeating the operation; and a key parameter supply unit supplying a key parameter to the nonlinear transformer of the sub-transformation unit corresponding to each repeated operation.

35. A data transformation apparatus for transforming input data A and input data B, comprising:

a first transformation unit for performing a first nonlinear transformation of the input data A and outputting a first transformed result as intermediate data B, and performing an XOR operation of the input data A and input data B and outputting a first result of the XOR operation as intermediate data A;

a second transformation unit for inputting the intermediate data A, performing a second nonlinear transformation of the intermediate data A and outputting a second transformed result as intermediate data B, and performing an XOR operation of intermediate data A and intermediate data B and outputting a second result of the XOR operation as intermediate data A, wherein said first transformation unit and said second transformation unit are connected in a cascade to output the intermediate data A and the intermediate data B as output data after transformation, and wherein the first and second nonlinear transformations are performed substantially in parallel.

* * * * *